US010972960B2

(12) United States Patent
Kim et al.

(10) Patent No.: US 10,972,960 B2
(45) Date of Patent: Apr. 6, 2021

(54) METHOD AND USER EQUIPMENT FOR BLOCKING NETWORK ACCESS BY ACDC

(71) Applicant: LG ELECTRONICS INC., Seoul (KR)

(72) Inventors: Jaehyun Kim, Seoul (KR); Youngdae Lee, Seoul (KR); Laeyoung Kim, Seoul (KR); Ki-Dong Lee, Seoul (KR); Hyunsook Kim, Seoul (KR); Taehun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 655 days.

(21) Appl. No.: 15/521,853

(22) PCT Filed: Nov. 10, 2015

(86) PCT No.: PCT/KR2015/012059
§ 371 (c)(1),
(2) Date: Apr. 25, 2017

(87) PCT Pub. No.: WO2016/076603
PCT Pub. Date: May 19, 2016

(65) Prior Publication Data
US 2017/0295536 A1    Oct. 12, 2017

Related U.S. Application Data

(60) Provisional application No. 62/077,324, filed on Nov. 10, 2014, provisional application No. 62/077,922, (Continued)

(51) Int. Cl.
*H04W 48/06* (2009.01)
*H04W 28/02* (2009.01)
(Continued)

(52) U.S. Cl.
CPC ......... *H04W 48/06* (2013.01); *H04L 47/2475* (2013.01); *H04W 28/02* (2013.01); *H04L 47/24* (2013.01)

(58) Field of Classification Search
CPC ...... H04W 48/06; H04W 28/02; H04L 47/24; H04L 47/2475
(Continued)

(56) References Cited

U.S. PATENT DOCUMENTS 8,320,964 B2 * 11/2012 Iwamura ............... H04W 48/02
455/560
8,520,850 B2 * 8/2013 Helms ................ H04N 21/6118
380/239
(Continued)

FOREIGN PATENT DOCUMENTS

CN     101159978 A    4/2008
CN     103857008 A    4/2008
(Continued)

OTHER PUBLICATIONS

3GPP TR 22.806 V13.1.0 (Sep. 2014), Technical Report, 3rd Generation Partnership Project; Technical Specification Group Services and System Aspects; Study on Application-Specific Congestion Control for Data Communication (Release 13), 41 pgs.
(Continued)

*Primary Examiner* — Moustafa M Meky
*Assistant Examiner* — Sahera Halim
(74) *Attorney, Agent, or Firm* — Birch, Stewart, Kolasch & Birch, LLP

(57) ABSTRACT

A disclosure of the present specification provides a method for blocking network access. The method may comprise the steps of: receiving application specific congestion control for data communication (ACDC) blocking information; driving a blocking timer when it is determined by an ACDC
(Continued)

blocking check that a network access attempt by a first application being executed is blocked; determining the category of a second application being executed according to a network access attempt by the second application; performing an ACDC blocking check on the basis of the determined category of the second application and the received ACDC blocking information when the determined category of the second application has a higher priority than the category of the first application; and stopping the blocking timer when the network access attempt by the second application should be permitted according to the ACDC blocking check.

17 Claims, 16 Drawing Sheets

Related U.S. Application Data filed on Nov. 11, 2014, provisional application No. 62/164,575, filed on May 21, 2015, provisional application No. 62/246,570, filed on Oct. 26, 2015.

(51) Int. Cl.
*H04L 12/859* (2013.01)
*H04L 12/851* (2013.01)

(58) Field of Classification Search
USPC .......................................................... 709/225
See application file for complete search history.

(56) References Cited

U.S. PATENT DOCUMENTS

| | | | | |
|---|---|---|---|---|
| 9,860,824 | B2* | 1/2018 | Kim | H04W 28/02 |
| 2013/0078999 | A1 | 3/2013 | Martin et al. | |
| 2015/0117213 | A1* | 4/2015 | Pinheiro | H04W 28/0284 |
| | | | | 370/235 |
| 2015/0173119 | A1* | 6/2015 | Wirtanen | H04W 36/0022 |
| | | | | 455/452.1 |
| 2015/0195712 | A1* | 7/2015 | Pinheiro | H04W 12/08 |
| | | | | 455/411 |
| 2015/0215220 | A1* | 7/2015 | Yiu | H04L 47/2475 |
| | | | | 370/230 |
| 2015/0215845 | A1* | 7/2015 | Pinheiro | H04W 48/06 |
| | | | | 455/418 |
| 2015/0271708 | A1* | 9/2015 | Zaus | H04W 76/18 |
| | | | | 370/230 |
| 2015/0289195 | A1* | 10/2015 | Gogic | H04W 48/06 |
| | | | | 370/230 |
| 2016/0014632 | A1* | 1/2016 | Siow | H04L 5/0085 |
| | | | | 370/230 |
| 2016/0066259 | A1* | 3/2016 | Guo | H04W 76/10 |
| | | | | 370/230 |
| 2016/0135143 | A1* | 5/2016 | Won | H04W 72/005 |
| | | | | 370/312 |
| 2016/0183165 | A1* | 6/2016 | Zhu | H04W 48/06 |
| | | | | 370/230 |
| 2016/0212653 | A1* | 7/2016 | Wang | H04W 28/0289 |
| 2016/0278096 | A1* | 9/2016 | Watfa | H04W 28/0205 |
| 2016/0330648 | A1* | 11/2016 | Hwang | H04W 48/02 |
| 2017/0041855 | A1* | 2/2017 | Paredes | H04W 28/0247 |
| 2017/0223691 | A1* | 8/2017 | Jung | H04W 72/0406 |
| 2018/0027479 | A1* | 1/2018 | Ahmad | H04W 48/12 |
| | | | | 370/235 |

FOREIGN PATENT DOCUMENTS

| | | | | |
|---|---|---|---|---|
| CN | 102118828 A | | 7/2011 | |
| CN | 102547912 A | | 7/2012 | |
| CN | 103379659 A | | 10/2013 | |
| GB | 2483120 A | * | 2/2012 | ........ H04M 3/42246 |
| WO | 2013/168700 A1 | | 11/2013 | |
| WO | WO 2014/160611 A1 | | 10/2014 | |

OTHER PUBLICATIONS

3GPP TS 23.401 V11.0.0 (Dec. 2011), Technical Specification, 3rd Generation Partnership Project; Technical Specification Group Services and System Aspects; General Packet Radio Service (GPRS) enhancements for Evolved Universal Terrestrial Radio Access Network (E-UTRAN) access (Release 11), 287 pgs.

3GPP TS 23.402 V11.0.0 (Sep. 2011), Technical Specification, 3rd Generation Partnership Project; Technical Specification Group Services and System Aspects; Architecture enhancements for non-3GPP accesses (Release 11), 232 pgs.

3GPP TS 24.008 V11.0.0 (Sep. 2011), Technical Specification, 3rd Generation Partnership Project; Technical Specification Group Core Network and Terminals; Mobile radio interface Layer 3 specification; Core network protocols; Stage 3 (Release 11), 645 pgs.

3GPP TS 24.301 V11.0.0 (Sep. 2011), Technical Specification, 3rd Generation Partnership Project; Technical Specification Core Network and Terminals; Non-Access-Stratum (NAS) protocol for Evolved Packet System (EPS); Stage 3 (Release 11), 323 pgs.

LG Electronics, Inc., "Some clarification in the statement of honouring ACDC category", S1-141163, 3GPP TSG-SA WG1 Meeting #66, Sapporo, Japan, May 12-16, 2014, 5 pgs.

NTT Docomo, Qualcomm Incorporated, "Number of ACDC categories", S1-143117, 3GPP TSG-SA WG1 Meeting #67, Sophia-Antipolis, France, Aug. 18-22, 2014, 4 pgs.

Qualcomm Incorporated, "ACDC System Overview", S1-141105, 3GPP TSG-SA WG1 #66, Sapporo, Japan, May 12-16, 2014, 8 pgs.

* cited by examiner

METHOD AND USER EQUIPMENT FOR BLOCKING NETWORK ACCESS BY ACDC

CROSS REFERENCE TO RELATED APPLICATIONS

This application is the National Phase of PCT International Application No. PCT/KR2015/012059, filed on Nov. 10, 2015, which claims priority under 35 U.S.C. 119(e) to U.S. Provisional Application No. 62/077,324, filed on Nov. 10, 2014, No. 62/077,922, filed on Nov. 11, 2014, No. 62/164,575, filed on May 21, 2015, No. 62/246,570, filed on Oct. 26, 2015, all of which are hereby expressly incorporated by reference into the present application.

BACKGROUND OF THE INVENTION

Field of the Invention

The present invention relates to a technique of barring access for congestion control in a mobile communication system.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004.

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE)) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WEAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| REFERENCE POINT | DESCRIPTION |
| --- | --- |
| S1-MME | A reference point for a control plane protocol between the E-UTRAN and the MME |
| S1-U | A reference point between the E-UTRAN and the S-GW for path switching between eNodeBs during handover and user plane tunneling per bearer |
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |
| S4 | A reference point between the SGW and the SGSN that provides related control and mobility support between the 3GPP anchor functions of a GPRS core and the S-GW. Furthermore, if a direct tunnel is not established, the reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

Among the reference points shown in FIG. 1, S2a and S2b correspond to non-3GPP interfaces. S2a is a reference point providing the user plane with related control and mobility support between a PDN GW and a reliable non-3GPP access. S2b is a reference point providing the user plane with mobility support and related control between a PDN GW and an ePDG.

FIG. 2 is an exemplary diagram showing the architecture of a common E-UTRAN and a common EPC.

As shown in FIG. 2, the eNodeB 20 can perform functions, such as routing to a gateway while RRC connection is activated, the scheduling and transmission of a paging message, the scheduling and transmission of a broadcast channel (BCH), the dynamic allocation of resources to UE in uplink and downlink, a configuration and providing for the measurement of the eNodeB 20, control of a radio bearer, radio admission control, and connection mobility control. The EPC can perform functions, such as the generation of paging, the management of an LTE_IDLE state, the ciphering of a user plane, control of an EPS bearer, the ciphering of NAS signaling, and integrity protection.

FIG. 3 is an exemplary diagram showing the structure of a radio interface protocol in a control plane between UE and an eNodeB, and FIG. 4 is another exemplary diagram showing the structure of a radio interface protocol in a control plane between UE and an eNodeB.

The radio interface protocol is based on a 3GPP radio access network standard. The radio interface protocol includes a physical layer, a data link layer, and a network layer horizontally, and it is divided into a user plane for the transmission of information and a control plane for the transfer of a control signal (or signaling).

The protocol layers may be classified into a first layer (L1), a second layer (L2), and a third layer (L3) based on three lower layers of the Open System Interconnection (OSI) reference model that is widely known in communication systems.

The layers of the radio protocol of the control plane shown in FIG. 3 and the radio protocol in the user plane of FIG. 4 are described below.

The physical layer PHY, that is, the first layer, provides information transfer service using physical channels. The PHY layer is connected to a Medium Access Control (MAC) layer placed in a higher layer through a transport channel, and data is transferred between the MAC layer and the PHY layer through the transport channel. Furthermore, data is transferred between different PHY layers, that is, PHY layers on the sender side and the receiver side, through the PHY layer.

A physical channel is made up of multiple subframes on a time axis and multiple subcarriers on a frequency axis. Here, one subframe is made up of a plurality of symbols and a plurality of subcarriers on the time axis. One subframe is made up of a plurality of resource blocks, and one resource block is made up of a plurality of symbols and a plurality of subcarriers. A Transmission Time Interval (TTI), that is, a unit time during which data is transmitted, is 1 ms corresponding to one subframe.

In accordance with 3GPP LTE, physical channels that are present in the physical layer of the sender side and the receiver side can be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

A PCFICH that is transmitted in the first OFDM symbol of a subframe carries a Control Format Indicator (CFI) regarding the number of OFDM symbols (i.e., the size of a control region) used to send control channels within the subframe. A wireless device first receives a CFI on a PCFICH and then monitors PDCCHs.

Unlike a PDCCH, a PCFICH is transmitted through the fixed PCFICH resources of a subframe without using blind decoding.

A PHICH carries positive-acknowledgement (ACK)/negative-acknowledgement (NACK) signals for an uplink (UL) Hybrid Automatic Repeat reQuest (HARQ). ACK/NACK signals for UL data on a PDSCH that is transmitted by a wireless device are transmitted on a PHICH.

A Physical Broadcast Channel (PBCH) is transmitted in four former OFDM symbols of the second slot of the first subframe of a radio frame. The PBCH carries system information that is essential for a wireless device to communicate with an eNodeB, and system information transmitted through a PBCH is called a Master Information Block (MIB). In contrast, system information transmitted on a PDSCH indicated by a PDCCH is called a System Information Block (SIB).

A PDCCH can carry the resource allocation and transport format of a downlink-shared channel (DL-SCH), information about the resource allocation of an uplink shared channel (UL-SCH), paging information for a PCH, system information for a DL-SCH, the resource allocation of an upper layer control message transmitted on a PDSCH, such as a random access response, a set of transmit power control commands for pieces of UE within a specific UE group, and the activation of a Voice over Internet Protocol (VoIP). A plurality of PDCCHs can be transmitted within the control region, and UE can monitor a plurality of PDCCHs. A PDCCH is transmitted on one Control Channel Element (CCE) or an aggregation of multiple contiguous CCEs. A CCE is a logical allocation unit used to provide a PDCCH with a coding rate according to the state of a radio channel. A CCE corresponds to a plurality of resource element groups. The format of a PDCCH and the number of bits of a possible PDCCH are determined by a relationship between the number of CCEs and a coding rate provided by CCEs.

Control information transmitted through a PDCCH is called Downlink Control Information (DCI). DCI can include the resource allocation of a PDSCH (also called a downlink (DL) grant)), the resource allocation of a PUSCH (also called an uplink (UL) grant), a set of transmit power control commands for pieces of UE within a specific UE group, and/or the activation of a Voice over Internet Protocol (VoIP).

Several layers are present in the second layer. First, a Medium Access Control (MAC) layer functions to map various logical channels to various transport channels and also plays a role of logical channel multiplexing for mapping multiple logical channels to one transport channel. The MAC layer is connected to a Radio Link Control (RLC) layer, that is, a higher layer, through a logical channel. The logical channel is basically divided into a control channel through which information of the control plane is transmitted and a traffic channel through which information of the user plane is transmitted depending on the type of transmitted information.

The RLC layer of the second layer functions to control a data size that is suitable for sending, by a lower layer, data received from a higher layer in a radio section by segmenting and concatenating the data. Furthermore, in order to guarantee various types of QoS required by radio bearers, the RLC layer provides three types of operation modes: a Transparent Mode (TM), an Un-acknowledged Mode (UM), and an Acknowledged Mode (AM). In particular, AM RLC performs a retransmission function through an Automatic Repeat and Request (ARQ) function for reliable data transmission.

The Packet Data Convergence Protocol (PDCP) layer of the second layer performs a header compression function for reducing the size of an IP packet header containing control information that is relatively large in size and unnecessary in order to efficiently send an IP packet, such as IPv4 or IPv6, in a radio section having a small bandwidth when sending the IP packet. Accordingly, transmission efficiency of the radio section can be increased because only essential information is transmitted in the header part of data. Furthermore, in an LTE system, the PDCP layer also performs a security function. The security function includes ciphering for preventing the interception of data by a third party and integrity protection for preventing the manipulation of data by a third party.

A Radio Resource Control (RRC) layer at the highest place of the third layer is defined only in the control plane and is responsible for control of logical channels, transport channels, and physical channels in relation to the configuration, re-configuration, and release of Radio Bearers (RBs). Here, the RB means service provided by the second layer in order to transfer data between UE and an E-UTRAN.

If an RRC connection is present between the RRC layer of UE and the RRC layer of a wireless network, the UE is in an RRC_CONNECTED state. If not, the UE is in an RRC_IDLE state.

An RRC state and an RRC connection method of UE are described below. The RRC state means whether or not the RRC layer of UE has been logically connected to the RRC layer of an E-UTRAN. If the RRC layer of UE is logically connected to the RRC layer of an E-UTRAN, it is called the RRC_CONNECTED state. If the RRC layer of UE is not logically connected to the RRC layer of an E-UTRAN, it is called the RRC_IDLE state. Since UE in the RRC_CONNECTED state has an RRC connection, an E-UTRAN can check the existence of the UE in a cell unit, and thus control the UE effectively. In contrast, if UE is in the RRC IDLE state, an E-UTRAN cannot check the existence of the UE, and a core network is managed in a Tracking Area (TA) unit, that is, an area unit greater than a cell. That is, only the existence of UE in the RRC_IDLE state is checked in an area unit greater than a cell. In such a case, the UE needs to shift to the RRC_CONNECTED state in order to be provided with common mobile communication service, such as voice or data. Each TA is classified through Tracking Area Identity (TAI). UE can configure TAI through Tracking Area Code (TAC), that is, information broadcasted by a cell.

When a user first turns on the power of UE, the UE first searches for a proper cell, establishes an RRC connection in the corresponding cell, and registers information about the UE with a core network. Thereafter, the UE stays in the RRC_IDLE state. The UE in the RRC_IDLE state (re) selects a cell if necessary and checks system information or paging information. This process is called camp on. When the UE in the RRC_IDLE state needs to establish an RRC connection, the UE establishes an RRC connection with the RRC layer of an E-UTRAN through an RRC connection procedure and shifts to the RRC_CONNECTED state. A case where the UE in the RRC_IDLE state needs to establish with an RRC connection includes multiple cases. The multiple cases may include, for example, a case where UL data needs to be transmitted for a reason, such as a call attempt made by a user and a case where a response message needs to be transmitted in response to a paging message received from an E-UTRAN.

A Non-Access Stratum (NAS) layer placed over the RRC layer performs functions, such as session management and mobility management.

The NAS layer shown in FIG. 3 is described in detail below.

Evolved Session Management (ESM) belonging to the NAS layer performs functions, such as the management of default bearers and the management of dedicated bearers, and ESM is responsible for control that is necessary for UE to use PS service from a network. Default bearer resources are characterized in that they are allocated by a network when UE first accesses a specific Packet Data Network (PDN) or accesses a network. Here, the network allocates an IP address available for UE so that the UE can use data service and the QoS of a default bearer. LTE supports two types of bearers: a bearer having Guaranteed Bit Rate (GBR) QoS characteristic that guarantees a specific bandwidth for the transmission and reception of data and a non-GBR bearer having the best effort QoS characteristic without guaranteeing a bandwidth. A default bearer is assigned a non-GBR bearer, and a dedicated bearer may be assigned a bearer having a GBR or non-GBR QoS characteristic.

In a network, a bearer assigned to UE is called an Evolved Packet Service (EPS) bearer. When assigning an EPS bearer, a network assigns one ID. This is called an EPS bearer ID. One EPS bearer has QoS characteristics of a Maximum Bit Rate (MBR) and a Guaranteed Bit Rate (GBR) or an Aggregated Maximum Bit Rate (AMBR).

Meanwhile, in FIG. 3, the RRC layer, the RLC layer, the MAC layer, and the PHY layer placed under the NAS layer are also collectively called an Access Stratum (AS).

FIG. 5a is a flowchart illustrating a random access process in 3GPP LTE.

The random access process is used for UE10 to obtain UL synchronization with a base station, that is, an eNodeB 20, or to be assigned UL radio resources.

The UE10 receives a root index and a physical random access channel (PRACH) configuration index from the eNodeB 20. 64 candidate random access preambles defined by a Zadoff-Chu (ZC) sequence are present in each cell. The root index is a logical index that is used for the UE to generate the 64 candidate random access preambles.

The transmission of a random access preamble is limited to specific time and frequency resources in each cell. The PRACH configuration index indicates a specific subframe on which a random access preamble can be transmitted and a preamble format.

The UE10 sends a randomly selected random access preamble to the eNodeB 20. Here, the UE10 selects one of the 64 candidate random access preambles. Furthermore, the UE selects a subframe corresponding to the PRACH configuration index. The UE10 sends the selected random access preamble in the selected subframe.

The eNodeB 20 that has received the random access preamble sends a Random Access Response (RAR) to the UE10. The random access response is detected in two steps. First, the UE10 detects a PDCCH masked with a random access-RNTI (RA-RNTI). The UE10 receives a random access response within a Medium Access Control (MAC) Protocol Data Unit (PDU) on a PDSCH that is indicated by the detected PDCCH.

FIG. 5b illustrates a connection process in a radio resource control (RRC) layer.

FIG. 5b shows an RRC state depending on whether there is an RRC connection. The RRC state denotes whether the entity of the RRC layer of UE10 is in logical connection with the entity of the RRC layer of eNodeB 20, and if yes, it is referred to as RRC connected state, and if no as RRC idle state.

In the connected state, UE10 has an RRC connection, and thus, the E-UTRAN may grasp the presence of the UE on a cell basis and may thus effectively control UE10. In contrast, UE10 in the idle state cannot grasp eNodeB 20 and is managed by a core network on the basis of a tracking area that is larger than a cell. The tracking area is a set of cells. That is, UE10 in the idle state is grasped for its presence only on a larger area basis, and the UE should switch to the connected state to receive a typical mobile communication service such as voice or data service.

When the user turns on UE10, UE10 searches for a proper cell and stays in idle state in the cell. UE10, when required, establishes an RRC connection with the RRC layer of eNodeB 20 through an RRC connection procedure and transits to the RRC connected state.

There are a number of situations where the UE staying in the idle state needs to establish an RRC connection, for example, when the user attempts to call or when uplink data transmission is needed, or when transmitting a message responsive to reception of a paging message from the EUTRAN.

In order for the idle UE10 to be RRC connected with eNodeB 20, UE10 needs to perform the RRC connection procedure as described above. The RRC connection procedure generally comes with the process in which UE10 transmits an RRC connection request message to eNodeB 20, the process in which eNodeB 20 transmits an RRC connection setup message to UE10, and the process in which UE10 transmits an RRC connection setup complete message to eNodeB 20. The processes are described in further detail with reference to FIG. 6.

1) The idle UE10, when attempting to establish an RRC connection, e.g., for attempting to call or transmit data or responding to paging from eNodeB 20, sends an RRC connection request message to eNodeB 20.

2) When receiving the RRC connection message from UE10, eNodeB 20 accepts the RRC connection request from UE10 if there are enough radio resources, and eNodeB 20 sends a response message, RRC connection setup message, to UE10.

3) When receiving the RRC connection setup message, UE10 transmits an RRC connection setup complete message to eNodeB 20. If UE10 successfully transmits the RRC connection setup message, UE10 happens to establish an RRC connection with eNodeB 20 and switches to the RRC connected state.

Meanwhile, when the UE10 requests the RRC connection for the purpose of data transmission of the user plane, if the network, for example, the base station (that is, eNodeB) is in the congest state, the UE10 may reject the request for the RRC connection.

In the overload and congest situation of the network, a method for differentiating the service per specific application of the UE is required. However, in the related art, there is no method of implementing the method.

SUMMARY OF THE INVENTION

Accordingly, an object of the present invention is to present a method that can solve the aforementioned problem.

In order to achieve the aforementioned purpose, one disclosure of the present specification provides a method for barring a network access. The method may comprise: receiving application specific congestion control for data communication (ACDC) barring information; running a barring timer if a network access tried by a first application being executed is determined to be barred by a ADDC barring check; determining a category of a second application being executed, according to a network access tried by the second application; performing a ACDC check based on the determined category for the second application and the received ACDC barring information, if the determined category of the second application has a higher priority than a priority of a category for the first application; and stopping the barring timer if the network access tried by the second application is allowed according to the ACDC check.

The running the barring timer may comprise: determining the category for the first application according to the network access tried by the first application being executed; performing the ACDC check based on the determined category for the first application and the received ACDC barring information; and barring the network access tried by the first application according to the ACDC check.

The method may further comprise: receiving application related attribute information.

The categories for the first application and the second application may be determined based on the application related attribute information.

The application related attribute information may include at least one of a group, a category, a priority, information and identifier (ID) of an application.

The application related attribute information may include categories of applications which are arranged in ascending or descending order of priorities.

The ACDC barring information may include: a barring rate, a barring factor, a barring time, a roaming information, and an access class barring (ACB) skipping configuration, which are defined per a specific unit of an application.

In order to achieve the aforementioned purpose, one disclosure of the present specification provides a user equipment (IE) for barring a network access. The UE may comprise: a transceiver; and a processor which controls the transceiver, wherein the processor is configured to perform: receiving application specific congestion control for data communication (ACDC) barring information; running a barring timer if a network access tried by a first application being executed is determined to be barred by a ADDC barring check; determining a category of a second application being executed, according to a network access tried by the second application; performing a ACDC check based on the determined category for the second application and the received ACDC barring information, if the determined category of the second application has a higher priority than a priority of a category for the first application; and stopping the barring timer if the network access tried by the second application is allowed according to the ACDC check.

According to the disclosure of the specification, the problem in the related art is solved. In detail, an unnecessary service delay between a terminal and a network can be prevented under an application based service environment of a system. Further, unnecessary network resource waste can be prevented.

DESCRIPTION OF EXEMPLARY EMBODIMENTS

Figure 1:
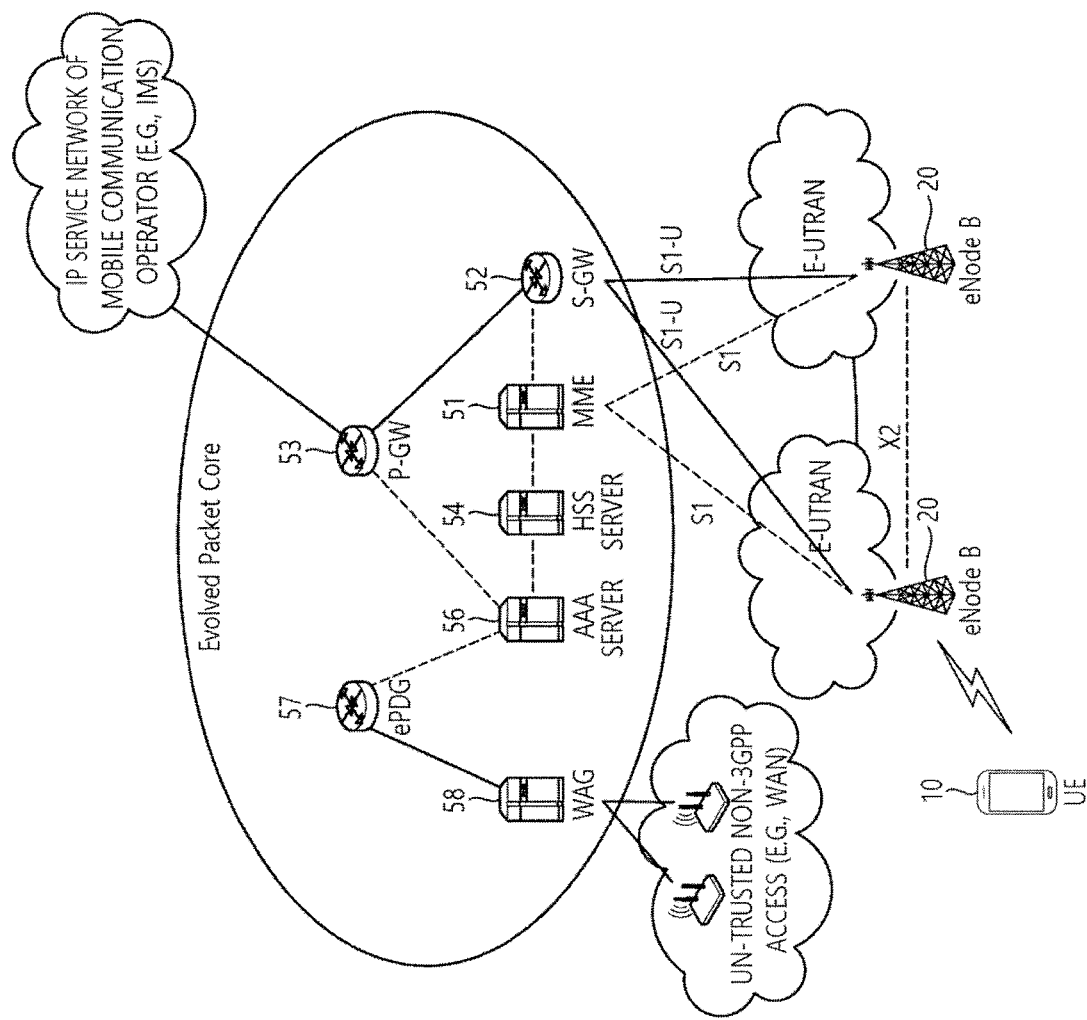
FIG. 1 is a structural diagram of an evolved mobile communication network.
Figure 2:
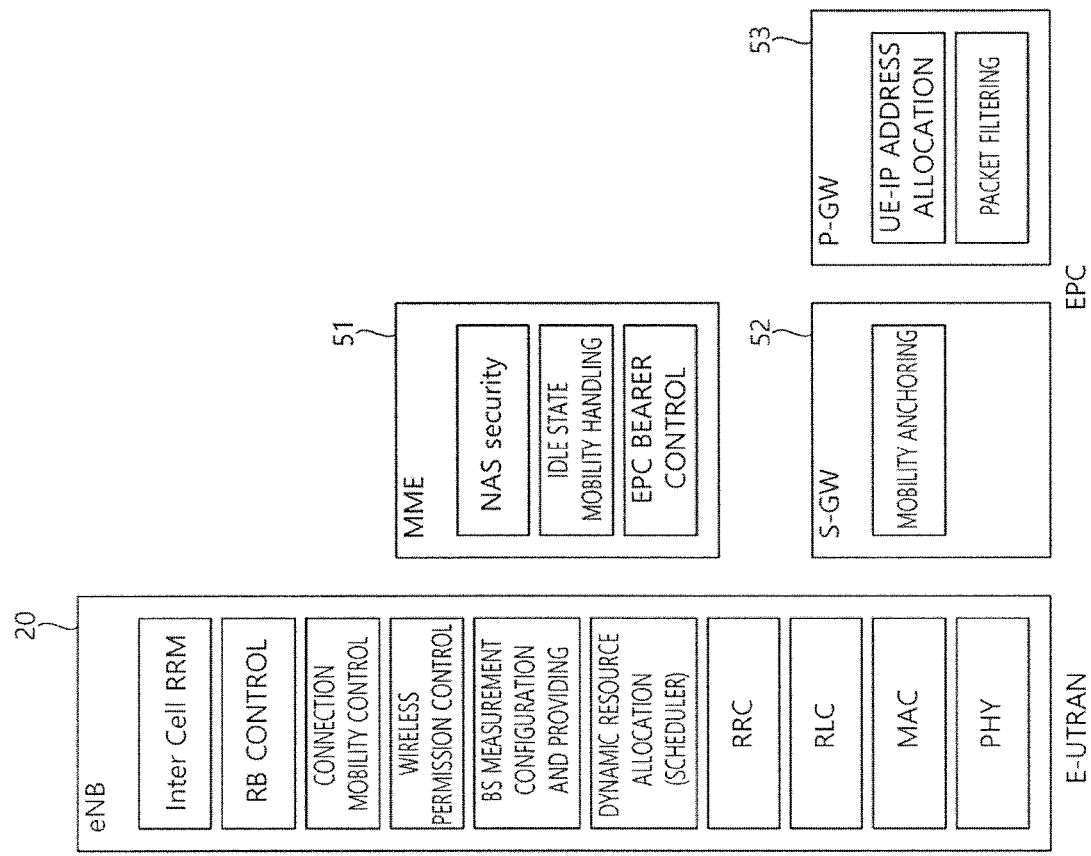
FIG. 2 is an exemplary diagram illustrating architectures of a general E-UTRAN and a general EPC.
Figure 3:
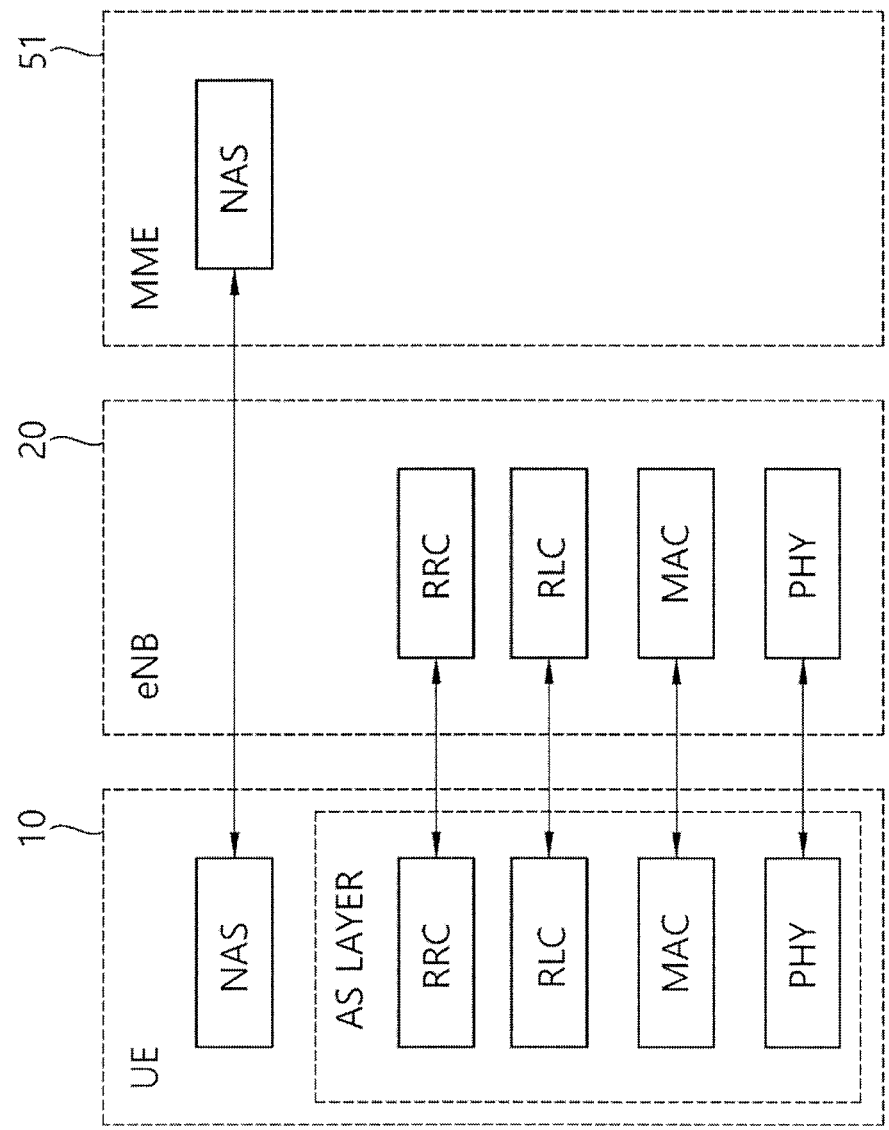
FIG. 3 is an exemplary diagram illustrating a structure of a radio interface protocol on a control plane between UE and eNodeB.
Figure 4:
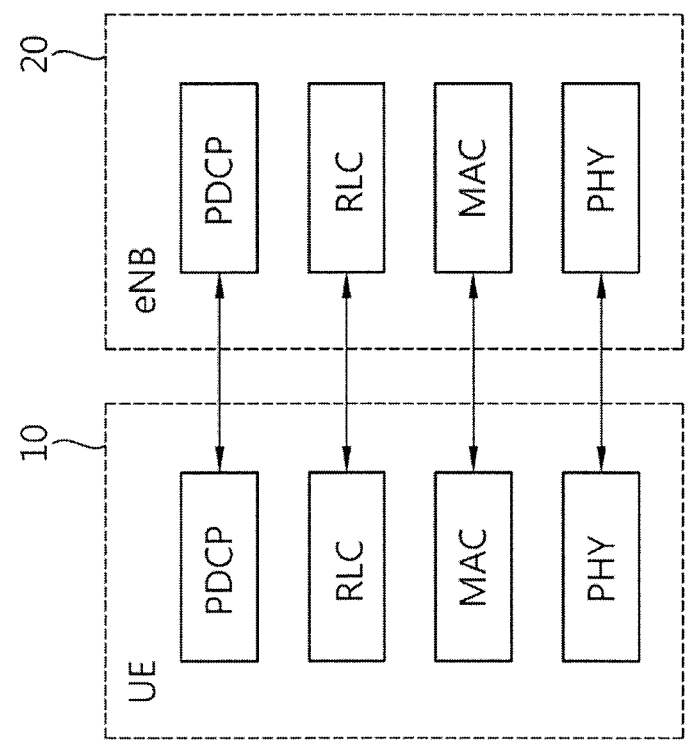
FIG. 4 is another exemplary diagram illustrating a structure of a radio interface protocol on a user plane between the UE and a base station.
Figure 5A:
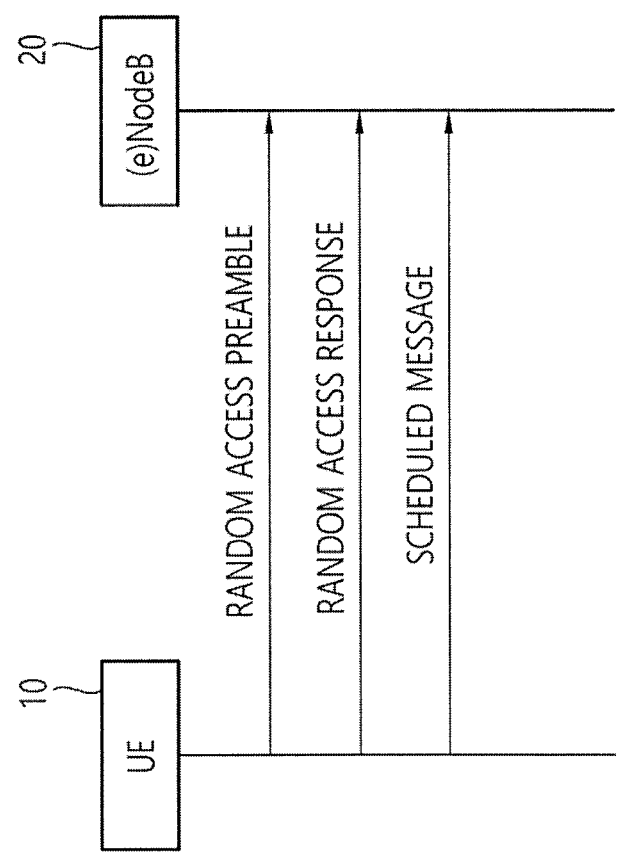
FIG. 5a is a flowchart illustrating a random access process in 3GPP LTE.
Figure 5B:
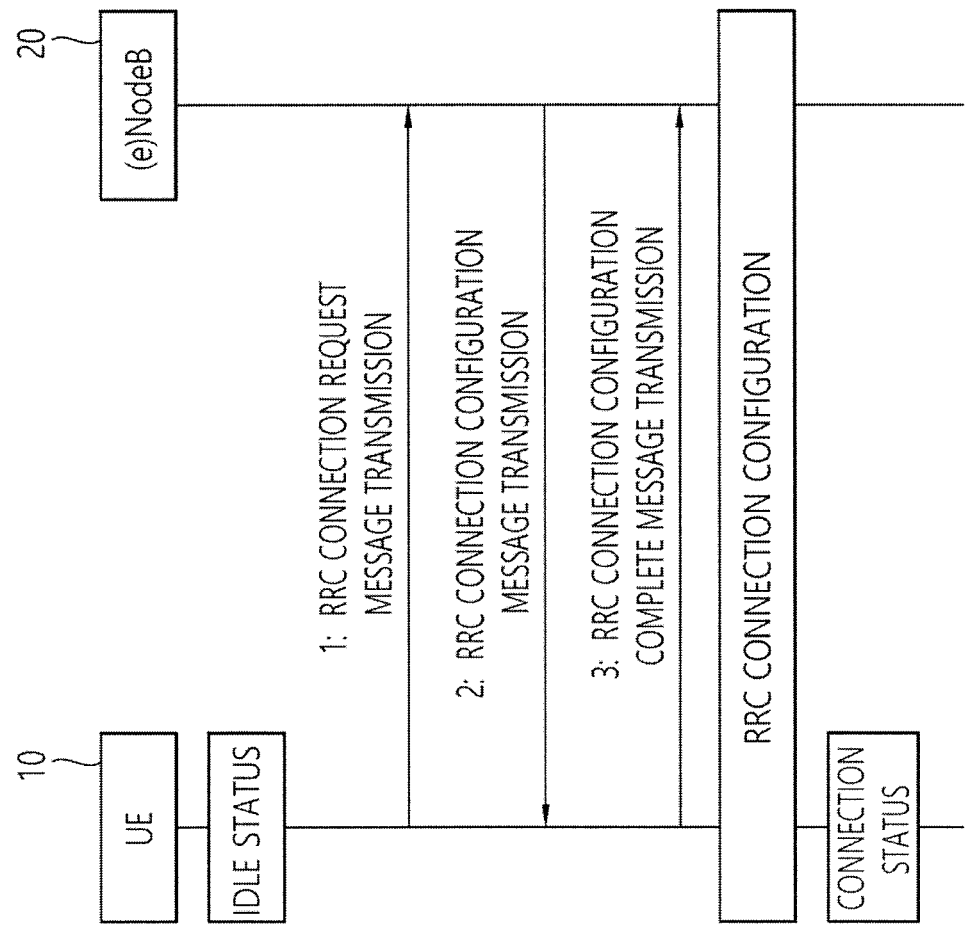
FIG. 5b illustrates a connection process in a radio resource control (RRC) layer.

The present invention is described in light of UMTS (Universal Mobile Telecommunication System) and EPC (Evolved Packet Core), but not limited to such communication systems, and may be rather applicable to all communication systems and methods to which the technical spirit of the present invention may apply.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

Definition of Terms

For a better understanding, the terms used herein are briefly defined before going to the detailed description of the invention with reference to the accompanying drawings.

An UMTS is an abbreviation of a Universal Mobile Telecommunication System, and it refers to the core network of the 3rd generation mobile communication.

UE/MS is an abbreviation of User Equipment/Mobile Station, and it refers to a terminal device.

An EPS is an abbreviation of an Evolved Packet System, and it refers to a core network supporting a Long Term Evolution (LIE) network and to a network evolved from an UMTS.

A PDN is an abbreviation of a Public Data Network, and it refers to an independent network where a service for providing service is placed.

A PDN connection refers to a connection from UE to a PDN, that is, an association (or connection) between UE represented by an IP address and a PDN represented by an APN.

A PDN-GW is an abbreviation of a Packet Data Network Gateway, and it refers to a network node of an EPS network which performs functions, such as the allocation of a UE IP address, packet screening & filtering, and the collection of charging data.

A Serving gateway (Serving GW) is a network node of an EPS network which performs functions, such as mobility anchor, packet routing, idle mode packet buffering, and triggering an MME to page UE.

A Policy and Charging Rule Function (PCRF): The node of an EPS network which performs a policy decision for dynamically applying QoS and a billing policy that are different for each service flow.

An Access Point Name (APN) is the name of an access point that is managed in a network and provides to UE. That is, an APN is a character string that denotes or identifies a PDN. Requested service or a network (PDN) is accessed via P-GW. An APN is a name (a character string, e.g., 'internet.mnc012.mcc345.gprs') previously defined within a network so that the P-GW can be searched for.

A Tunnel Endpoint Identifier (TEID): The end point ID of a tunnel set between nodes within a network, and it is set for each bearer unit of each UE.

A NodeB is an eNodeB of a UMTS network and installed outdoors. The cell coverage of the NodeB corresponds to a macro cell.

An eNodeB is an eNodeB of an Evolved Packet System (EPS) and is installed outdoors. The cell coverage of the eNodeB corresponds to a macro cell.

An (e)NodeB is a term that denotes a NodeB and an eNodeB.

An MME is an abbreviation of a Mobility Management Entity, and it functions to control each entity within an EPS in order to provide a session and mobility for UE.

A session is a passage for data transmission, and a unit thereof may be a PDN, a bearer, or an IP flow unit. The units may be classified into a unit of the entire target network (i.e., an APN or PDN unit) as defined in 3GPP, a unit (i.e., a bearer unit) classified based on QoS within the entire target network, and a destination IP address unit.

A PDN connection is a connection from UE to a PDN, that is, an association (or connection) between UE represented by an IP address and a PDN represented by an APN. It means a connection between entities (i.e., UE-PDN GW) within a core network so that a session can be formed.

UE context is information about the situation of UE which is used to manage the UE in a network, that is, situation information including an UE ID, mobility (e.g., a current location), and the attributes of a session (e.g., QoS and priority)

OMA DM (Open Mobile Alliance Device Management): a protocol designed for managing mobile devices such as mobile phones, PDAs, or portable computers and performs functions such as device configuration, firmware upgrade, and error reporting.

OAM (Operation Administration and Maintenance): denotes a group of network management functions displaying network faults and providing capability information, diagnosis and data.

NAS configuration MO (Management Object): MO (Management Object) used to configure in UE parameter associated with NAS functionality NAS (Non-Access-Stratum): A higher stratum of a control plane between a UE and an MME. The NAS supports mobility management, session management, IP address management, etc., between the UE and the network.

MM (Mobility Management) operation/procedure: An operation or procedure for mobility regulation/management/control of the UE. The MM operation/procedure may be interpreted as including one or more of an MM operation/procedure in a CS network, a GMM operation/procedure in a GPRS network, and an EMM operation/procedure in an EPS network. The UE and the network node (e.g., MME, SGSN, and MSC) exchange an MM message to perform the MM operation/procedure.

SM (Session Management) operation/procedure: An operation or procedure for regulating/managing/processing/handling a user plane and/or a bearer context/PDP context of the UE. The SM operation/procedure may be interpreted as including one or more of an SM operation/procedure in a GPRS network and an ESM operation/procedure in an EPS network. The UE and the network node (e.g., MME and SGSN) exchange an SM message to perform the SM operation/procedure.

Low priority UE: A UE configured for NAS signalling low priority. The standard document 3GPP TS 24.301 and TS 24.008 may be incorporated by reference for details thereof.

Normal priority UE: A normal UE not configured with low priority.

Dual priority UE: A UE configured for dual priority. That is, a UE which provides dual priority support is configured for a NAS signalling low priority and also configured to override the NAS signalling low priority indicator. The standard document 3GPP TS 24.301 and TS 24.008 may be incorporated by reference for details thereof.

PLMN: as an abbreviation of Public Land Mobile Network, means a network identification number of a mobile communication provider. In roaming case of the UE, the PLMN is classifed into a home PLMN (HPLMN) and a vistied PLMN (VPLMN).

Hereinafter, an aspect of the present specification is described with reference to the accompanying drawings.

Figure 6:
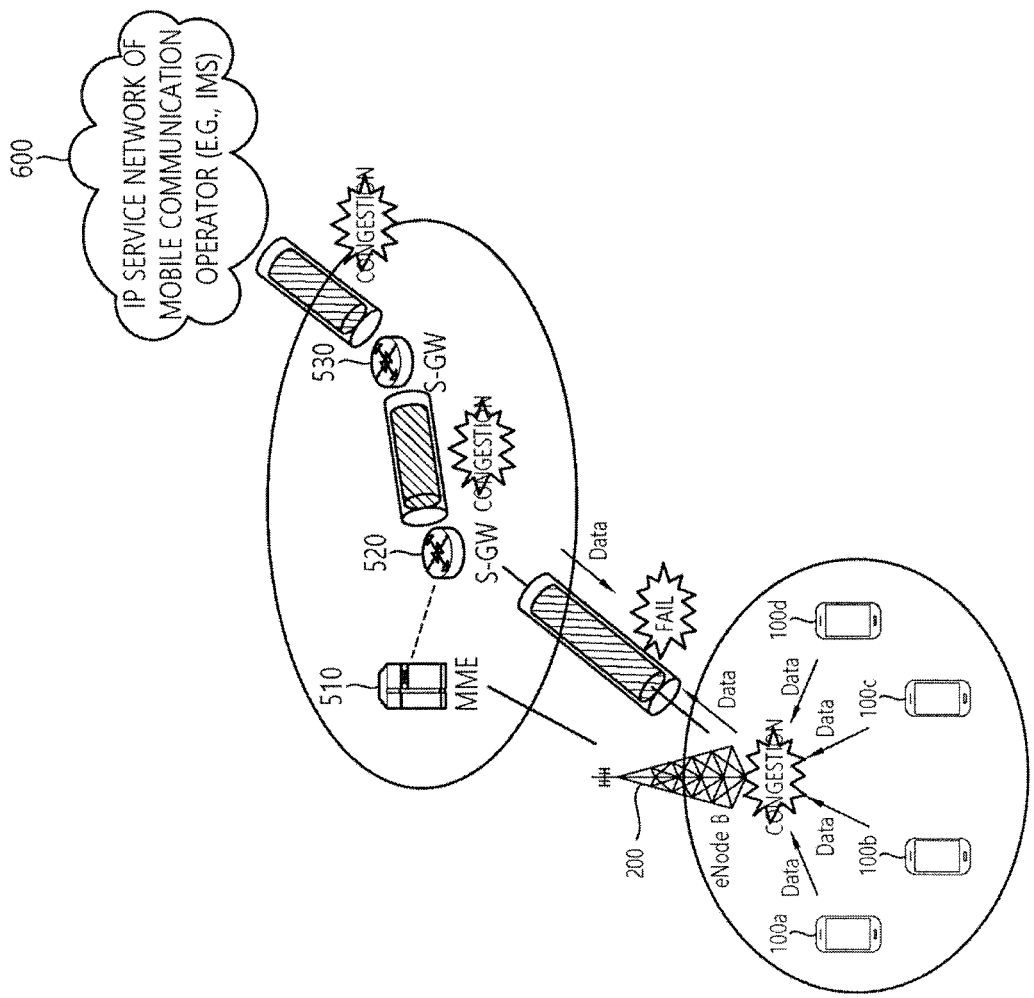
FIG. 6 illustrates a network overloaded state.

FIG. 6 shows a network overload state.

As shown in FIG. 6, many UEs 100a, 100b, 300c, and 300d are present in the coverage of an eNodeB 200, and data transmission/reception is attempted. Accordingly, if traffic is overloaded or congested in an interface between the eNodeB 200 and an S-GW 520, downlink data to the MTC device 100 or uplink data from the UE100 is not correctly transmitted and thus data transmission fails.

Alternatively, even if an interface between the S-GW 520 and a PDN-GW 530 or an interface between the PDN-GW 530 and an Internet Protocol (IP) service network of a mobile communication operator is overloaded or congested, downlink data to the UEs 100a, 100b, 300c, and 300d or uplink data from the UEs 100a, 100b, 300c, and 300d is not correctly transmitted and thus data transmission fails.

If an interface between the eNodeB 200 and the S-GW 520 is overloaded or congested or if an interface between the S-GW 520 and the PDN-GW 530 is overloaded or congested, a node (e.g., MME) of the core network performs a NAS level congest control to avoid or control signaling congestion and APN congestion.

The NAS level congestion control consists of an APN based congestion control and a general NAS level mobility management control.

The APN based congestion control implies an EMM, GMM, and (E)SM signal congestion control related to a UE and a specific APN (i.e., an APN related to a congestion state), and includes an APN based session management congestion control and an APN based mobility management congestion control.

On the other hand, the general NAS level mobility management control implies that a node (MME, SGSN) in the core network rejects a mobility management signaling request which is requested by the UE/MS in a general network congestion or overload situation to avoid the congestion and the overload.

In general, if the core network performs the NAS level congestion control, a back-off timer value is transmitted to a UE in an idle mode or a connected mode by being carried on a NAS reject message. In this case, the UE does not request an EMM/GMM/(E)SM signal to the network until the back-off timer expires. The NAS reject message is one of an Attach reject, a Tracking Area Updating (TAU) reject, a Routing Area Updating (RAU) reject, a service reject, an extended service reject, a PDN connectivity reject, a bearer resource allocation reject, a bearer resource modification reject, and a deactivate EPS bearer context request reject.

The back-off timer may be classified into a Mobility Management (MM) back-off timer and a Session Management (SM) back-off timer.

The MM back-off timer operates independently for each UE, and the SM back-off timer operates independently for each APN and each UE.

Simply, the MM back-off timer is for controlling an EMM/GMM signal (e.g., Attach, TAU/RAU request, etc.). The SM back-off timer is for controlling an (E)SM signal (e.g., PDN connectivity, Bearer Resource Allocation, Bearer Modification, PDP Context Activation, PDP Context Modification request, etc.).

More specifically, the MM back-off timer is a mobility management related back-off timer used to control a case where a network congestion occurs, and is a timer which prevents the UE from performing an attach, location information update (TAU, RAU), and service request procedure during the timer is running. However, exceptionally in case of an emergency bearer service and a Multimedia Priority Service (MPS), the UE may be allowed to perform the request even if the timer is running.

As described above, the UE may receive the MM back-off timer value from a core network node (e.g., MME, SGSN, etc.) or from a lower layer (access stratum). In addition, the timer value may be randomly set by the UE within the range of 15 minutes to 30 minutes.

The SM back-off timer is a session management related back-off timer used to control a case where a network congestion occurs, and is a timer which prevents the UE from configuring or changing an associated APN-based session. However, likewise, exceptionally in case of an emergency bearer service and a Multimedia Priority Service (MPS), the UE100 may be allowed to perform the request even if the timer is running.

The UE receives the SM back-off timer value from the core network node (e.g., MME, SGSN, etc.), and is randomly set within up to 72 hours. In addition, the timer value may be randomly set by the UE/MS within the range of 15 minutes to 30 minutes.

On the other hand, when the congestion occurs in the eNodeB 200, the eNodeB 200 may perform congestion control. That is, when the UE requests RRC connection establishment for data transmission of the user plane, if the eNodeB 200 is in the congest state, the eNodeB 200 may transmit a reject response to the UE together with an extended wait timer. In this case, the RRC connection establishment request may not be re-attempted until the extended wait timer expires. On the contrary, when the UE requests the RRC connection for transmitting the signal of the control plane for circuit switch (CS)-based call reception, even through the eNodeB 200 is in the congest state, the RRC connection request may not be rejected.

Figure 7:
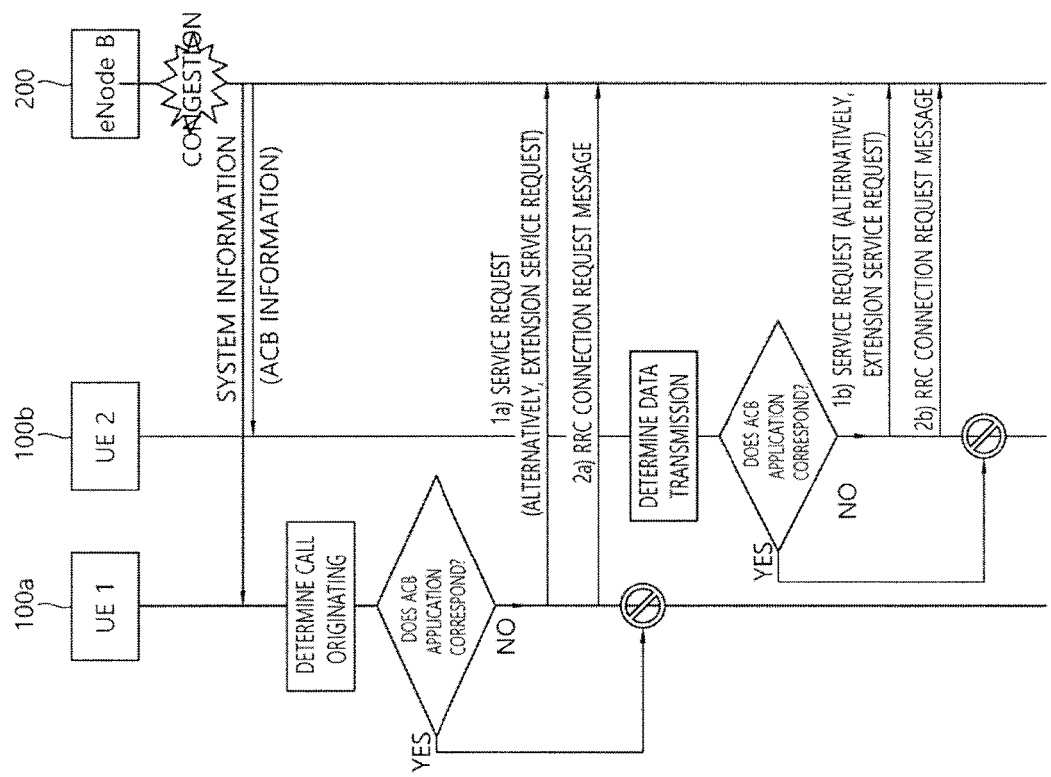
FIG. 7 is an exemplary flowchart illustrating an access barring operation in a network congested state.

FIG. 7 is an exemplary flowchart illustrating an access barring operation in a network congested state.

As illustrated in FIG. 7, in the overload or congest state of the network or the eNodeB 200, the eNodeB 200 may broadcast access class barring (ACB)-related information through system information. The system information may be system information block (SIB) type 2.

The SIB type 2 may include ACB-related information like the following table.

TABLE 2

| Field | Description |
| --- | --- |
| ac-BarringFactor | When a random value generated by the UE is smaller than a value of ac-BarringFactor, access is allowed. If not, the access is barred. |
| ac-BarringForCSFB | ACB for circuit switch (CS) fallback. The CS fallback converts a VoLTE call to a previous 3G call. |
| ac-BarringForEmergency | ACB for emergency service |
| ac-BarringForMO-Data | ACB for mobile orienting data |
| ac-BarringForMO-Signalling | ACB for mobile orienting control signal |
| ac-BarringForSpecialAC | ACB for specific access classes, that is, 11 to 15. |

TABLE 2-continued

| Field | Description |
| --- | --- |
| ac-BarringTime | Represents time when the access is barred. |
| ssac-BarringForMMTEL-Video | ACB for each service for mobile orienting of MMTEL video. |
| ssac-BarringForMMTEL-Voice | ACB for each service for mobile orienting of MMTEL voice. |

Meanwhile, UE1 100*a* determines an IMS service, for example, mobile orienting of a call by VoLTE and generates a service request message. Similarly, UE2 100*b* determines mobile orienting of general data and generate the service request message.

Sequentially, the UE1 100*a* generates an RRC connection request message. Similarly, the UE2 100*b* generate the RRC connection request message.

Meanwhile, the UE1 100*a* performs access barring check (that is, whether the ACB is applied). Similarly, the UE2 100*b* performs access barring check (that is, whether the ACB is applied).

If the ACB is not applied, the UE1 100*a* and the UE2 100*b* may transmit a service request (alternatively, an extended service request) message and the RRC connection request message, respectively. However, when the ACB is applied, both the UE1 100*a* and the UE2 100*b* may not transmit the RRC connection request message, respectively.

The access barring check will be described in detail as follows. Generally, at least one of 10 access classes (for example, AC0, AC1, . . . , and AC9) is randomly allocated to the UE. Exceptionally, for urgent emergency access, AC10 is allocated. As such, the value of the randomly allocated access class may be stored in each USIM of the UE1 100*a* and the UE2 100*b*. Then, the UE1 100*a* and the UE2 100*b* verify whether the access barring is applied, by using a barring factor included in the received ACB-related information, based on the stored access class. The access barring check is performed in each access stratum (AS) layer, that is, an RRC layer of the UE1 100*a* and the UE2 100*b*.

The access barring check will be described in more detail as follows.

The ac-BarringPerPLMN-List is included in the SIB type 2 received by each of the UE1 100*a* and the UE2 100*b*, and in the case where AC-BarringPerPLMN entry matched with a plmn-identityIndex corresponding to the PLMN selected in an higher layer is included in the ac-BarringPerPLMN-List, AC-BarringPerPLMN entry matched with the plmn-identityIndex corresponding to the PLMN selected by the higher layer is selected.

Next, when the UE1 100*a* and the UE2 100*b* perform the RRC connection request, the access barring check is performed by using T303 as Tbarring and using ac-BarringForMO-Data as a barring parameter.

When the barring is determined, each AS(RRC) layer of the UE1 100*a* and the UE2 100*b* notifies a failure of the RRC connection establishment to the higher layer.

Subsequently, as such, when the access is barred, each AS(RRC) layer determines whether a T302 timer or a Tbarring timer is driving. If the timer is not driving, the T302 timer or the Tbarring timer is driven.

Meanwhile, while the T302 timer or a Tbarring timer is driving, the AS(RRC) layer considers that all the access to the corresponding cell is barred.

As described above, in the network overload and congest situation, the eNB/RNC provides the ACB-related information to the UE. Then, the UE checks the access barring by using the barring factor included in the received ACB information based on its access class stored in the USIM. Through the access barring check, finally, an access attempt is not performed. That is, when the access to the corresponding cell is barred through the access barring check, the UE does not attempt the access, and when the access to the corresponding cell is not barred, the UE attempts the access. The access barring check is performed in the AS layer. Herein, the access attempt means that the AS(RRC) layer of the UE transmits the RRC connection request message to the eNB/RNC.

Meanwhile, the access barring check performs general mobile originating (MO) services of the UE, for example, originating call, originating data, originating IMS voice, and originating IMS video. That is, the ACB is applied to access of all application programs (but, except for a response to an emergency service or paging).

Figure 8:
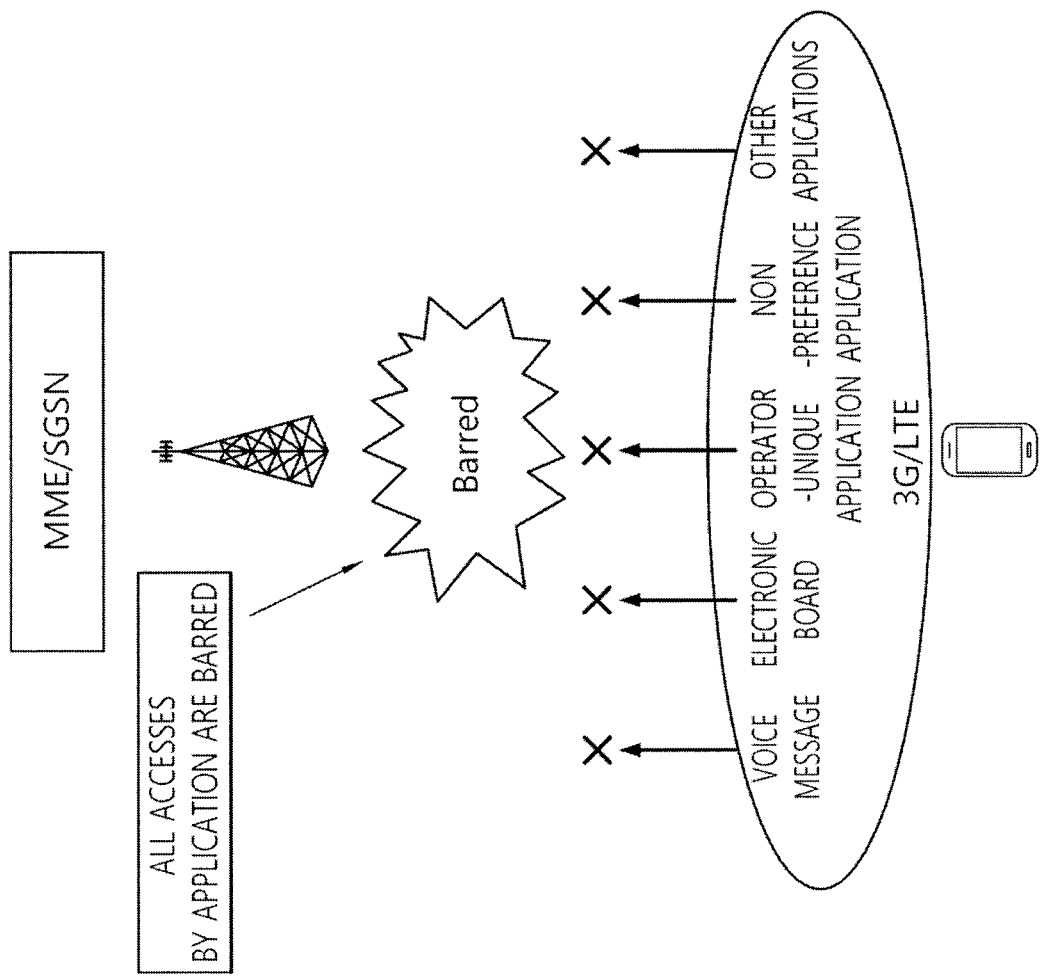
FIG. 8 illustrates an example in which an access due to all applications is barred, when ACB is applied.

FIG. 8 illustrates an example in which access due to all applications is barred, when ACB is applied.

As illustrated in FIG. 8, when it is determined that the ACB is applied, the access due to all of the applications of the UE (but, except for the response to an emergency service or paging) is fully barred.

As such, the access due to all of the applications is barred and thus, the differentiated service is impossible. The problem deteriorates network resource waste and user's experience.

Accordingly, in the network overload and congest situation, a method for differentiating an MO service for each specific application group/category (for example, originating call or originating data) is required. However, in the related art, there is no method of implementing the method.

<Introduction of Application specific Congestion control for Data Communication (ACDC)>

An application specific congestion control for data communication (ACDC) has been suggested as a way to differentiate a general mobile originating (MO) service such as an originating call, an originating data, an originating IMS voice, and an originating IMS video.

Figure 9:
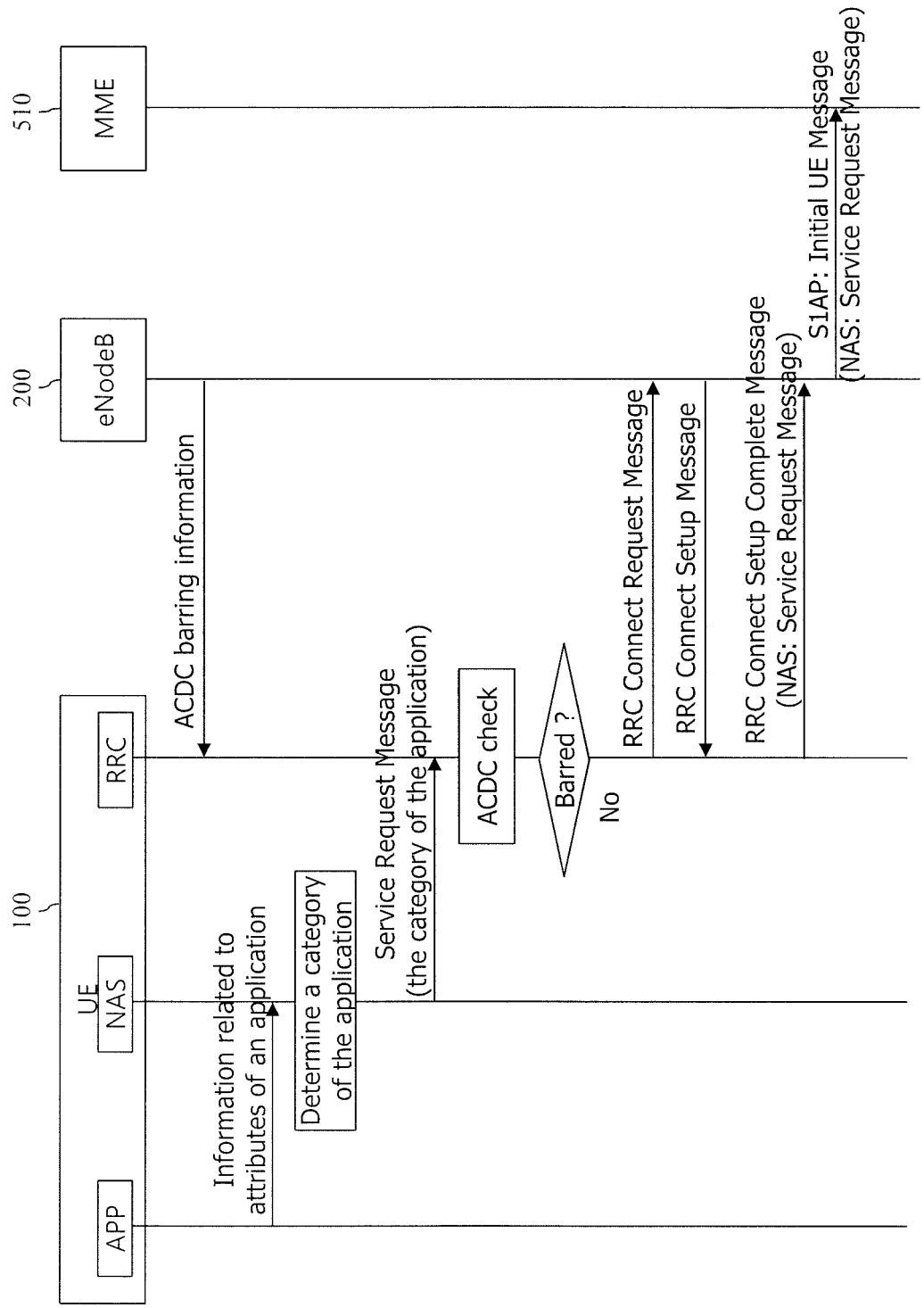
FIG. 9 is a signal flowchart illustrating a procedure according to ACDC.

FIG. 9 is a signal flowchart illustrating a procedure according to ACDC.

FIG. 9 is described as follows.

First, a network (e.g., an eNodeB) may provide ACDC barring information to the UE through SIB.

Meanwhile, if a specific application is executed and a data communication service is requested by the specification application in the UE100, the application layer managing the execution of the specific application provides the information related to attributes of the application to the NAS layer.

Then the NAS layer of the UE100 determines the category of the application for the ACDC based on the information related to attributes of the applications received from the application layer.

Then when starting the service request procedure for the service connection (transmission of SERVICE REQUEST message or transmission of EXTENDED SERVICE REQUEST message), the NAS layer of the UE100 delivers information on the category of the application to the AS layer (i.e., RRC layer).

The AS layer (i.e., RRC layer) of the UE100 performs the ACDC barring check based on the category of the application and the ACDC barring information received from the network and determines whether to allow the service request procedure according thereto before performing the service request procedure of the NAS layer (transmission of SERVICE REQUEST message or transmission of EXTENDED SERVICE REQUEST message).

As a result of the ACDC barring check, if allowed, the AS layer (i.e., RRC layer) of the UE 100 transmits the RRC connect request message to the eNodeB 200.

As described above, the service request required by the currently executed application within the UE may be differentiated so as to be allowed or barred.

However, once the service request is barred by the ACDC, any other application within the UE cannot perform the service request until the timer expires. Hence, even if an application with a priority higher than that of the application having caused the barring of the service request requests the service, there is an inefficiency that the service request is not accepted. Hereinafter, FIG. 10 will be described.

Figure 10:
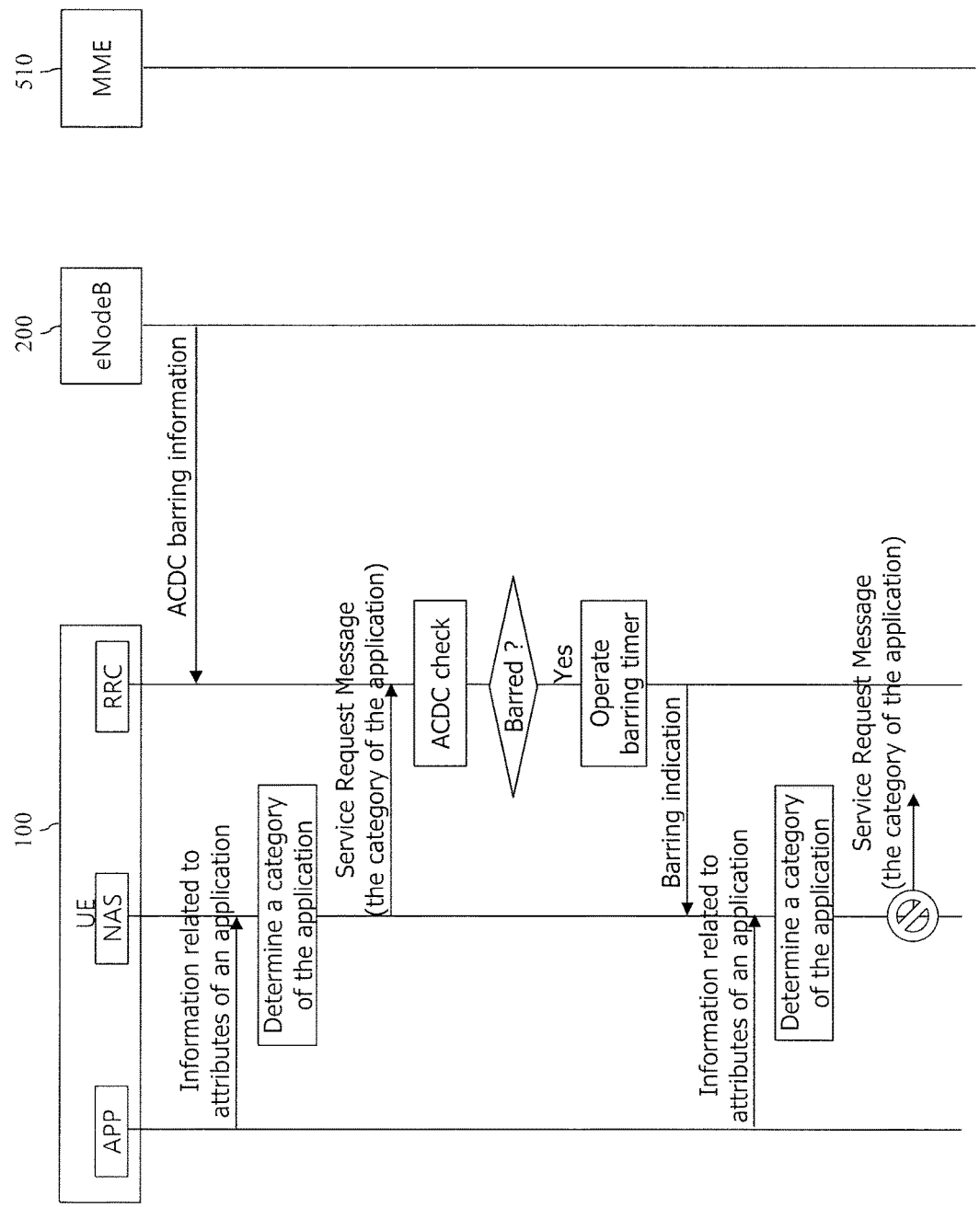
FIG. 10 is a signal flowchart illustrating inefficiency of ACDC.

FIG. 10 is a signal flowchart illustrating inefficiency of ACDC.

The AS layer (i.e., RRC layer) of the UE 100 performs the ACDC barring check and bars the request by the first application according thereto. Then the AS layer operates the barring timer.

Likewise, if the ACDC barring check result is barred, the AC layer delivers the indication indicating that the access to the cell has been barred to the NAS layer. Then the NAS layer stops the corresponding NAS service request procedure.

Meanwhile, the second application with a higher priority requests the service.

However, the NAS layer cannot perform any differentiation for the second application with a priority higher than that of the first application having caused the barring until the indication indicating the alleviation of the barred access to the cell is delivered to the NAS layer by the expiration of the barring timer currently operating in the AS layer (i.e., RRC layer).

Hence, the service request for the second application with a priority higher than that of the first application having caused the barring also fails.

As described above, once barred by the ACDC, there is an inefficiency that the service request of the second application with a priority higher than that of the first application having caused the barring is not accepted.

<Disclosure of the Present Specification>

Hence, the disclosure of the present specification proposes a method for improving the above-described inefficiency.

The information related to attributes of the applications used for the present specification means information including one or more combinations of group/category/priority information/ID of the application. The network may inform the UE of such information related to attributes of the applications through the attach procedure/TAU procedure/RAU procedure. Namely, the network may inform the UE of the information related to attributes of the applications through ATTACH acceptance message, TAU acceptance message and RAU acceptance message. Alternatively, such information related to attributes of the applications may be provided to the UE through an NAS setting management object (MO) or a new application MO (e.g., access control MO per application). Alternatively, the information related to the application may have been set in advance in the USIM, etc. in the UE.

Further, information on the category of the application for the ACDC means group/category/priority mapping information of the application which is determined based on the information related to attributes of the application. The information on the category of the application for the ACDC may be provided/notified to the UE 100 through an Attach/TAU/RAU procedure (e.g., ATTACH ACCEPT message, TAU ACCEPT message, RAU ACCEPT message). At this time, the UE may provide the capability indication/information for performing the ACDC barring check to the network through an Attach/TAU/RAU procedure (e.g., ATTACH REQUEST message, TAU REQUEST message, and RAU REQUEST message) then provide information on the category of the application for an ACDC to the UE 100 through Attach/TAU/RAU procedure (e.g., ATTACH ACCEPT message, TAU ACCEPT message, and RAU ACCEPT message) based thereon in the network (e.g., when the ACDC barring check is supported). Further, information on the category of the application for such an ACDC may be included in an NAS setting MO (management object) or a new application MO (e.g., an application-specific (access control) management object) and may be provided to the UE100 through the OMA DM. Otherwise, information on the category of the application for the ACDC may have been set in advance in the USIM, etc. in the UE 100.

Further, the ACDC barring information means information including the barring ratio, barring factor, barring time, roaming information, and ACB skip setting defined per application category for (specific) ACDC (i.e., information such as barring ratio, barring factor, average barring time, and ACB skip setting (ACB skipping is On/configured/True or ACB skipping is Off/not configured/False) per application group/category/priority information/ID).

I. Suggestion 1 of the present specification (Suggestion 5 of provisional application)

Suggestion 1 of the present specification relates to a method for overriding the barring by a category of the application with a high priority when barred by an application having a low category as a result of the ACDC barring check.

Figure 11:
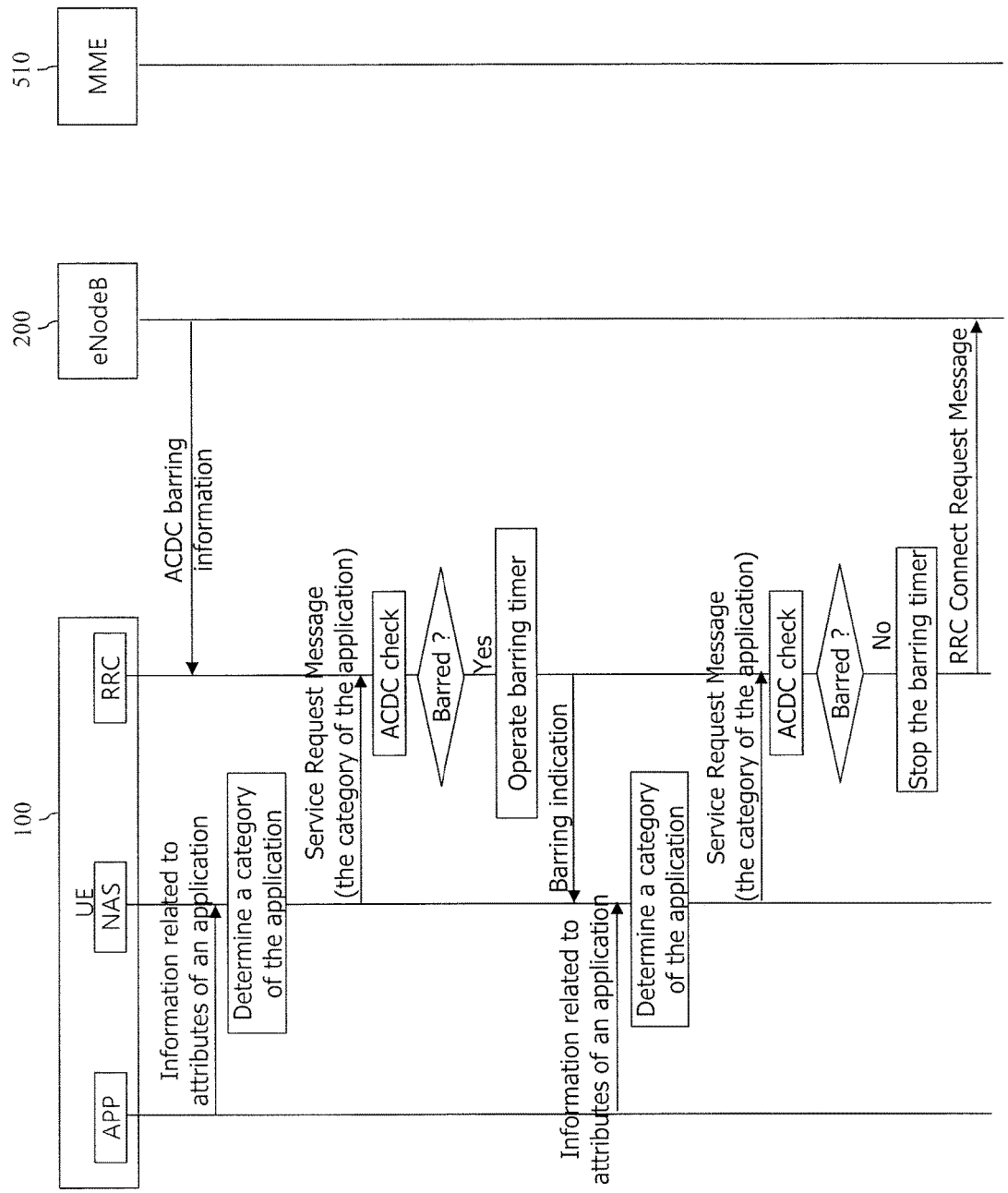
FIG. 11 is a signal flowchart of an ACDC procedure according to a suggestion of the present specification.

FIG. 11 is a signal flowchart of an ACDC procedure according to a suggestion of the present specification.

Referring to FIG. 11, the network (e.g., the eNodeB) may provide the ACDC barring information to the UE 100 through SIB. The ACDC barring information is defined per a category of the application. FIG. 11 illustrates that such ACDC barring information is received by the AS layer (i.e., RRC layer) of the UE 100. However, such ACDC barring information may be received by the application layer (or NAS layer). Further, when starting the data communication service, the application layer may request and receive such information by requesting to the AS layer (i.e., RRC layer).

Meanwhile, when the application layer starts the data communication service, in order to differentiate the service of the specific application, the application layer provides information related to attributes of the applications to the NAS layer, and the NAS layer determines the category of the application (or a plurality of application categories) for the ACDC. Such information on the category of the application for the ACDC may be included in the NAS setting MO or a new application MO (e.g., application specific (access control) MO) and may be provided to the UE 100 through the OMA DM. Otherwise, information on the category of the application may have been set in advance in the USIM, etc. in the UE 100.

Thereafter, the NAS layer provides the determined information on the category of the application (e.g., category C) to the AS layer (i.e., RRC layer).

In order to differentiate the application service, the AS layer performs the ACDC barring check based on the ACDC barring information received in the network based on information on the category of the application (e.g., category C) for the ACDC obtained from the NAS layer.

At this time, for example, when the category of the application for the ACDC is C, the AS layer performs the ACDC barring check based on the category of the application C.

As a result of performing the ACDC barring check, when the access to the serving cell is barred, the AS layer (i.e., RRC layer) operates the barring timer. The barring timer may be a timer which is the same as the barring timer used in the ACB or may be a timer which is newly defined for the ACDC. Further, the AS layer delivers an indication indicating the barring to the NAS layer. The indication indicating the barring may be the same as the indication used in the case that is barred in the existing ACB check. Further, the indication indicating the barring may be a new indication which is different from the indication used in the case that is barred in the existing ACB check.

Then the NAS layer stops the corresponding NAS signaling connection request procedure (e.g., service request procedure or extended service request procedure), TAU/RAU request procedure, attach request procedure).

Further, the NAS layer records and manages by which category of application (e.g., category C) the service request procedure has been barred.

Meanwhile, the NAS layer of the UE 100 receives information related to attributes of another application from the application layer and determines that the another application corresponds to application category B for the ACDC based thereon.

When the priority of the determined category is not higher than that of the category of the application having caused the barring, the NAS layer may not start the NAS signaling connection request procedure required by the application. However, when the determined application category B has a priority higher than that of the category C of the application having caused the barring, the NAS layer starts the NAS signal connection request procedure required by the application belonging to the category B of the application.

The NAS layer delivers the service request message and the information on the determined category of the application to the AS layer.

Then the AS layer stops the currently operating barring tinier. Further, the AS layer newly performs the ACDC barring check.

Even though the ACDC barring check has been newly performed, if a request by an application belonging to the category of the application having a higher priority is barred, the AS layer provides an indication indicating the barring to the NAS layer (or application layer) and operates the barring timer. The operation of the barring timer may be a resumption of the previously stopped operation or may be the operation after initialization of the barring timer.

However, as a result from performing again the ACDC barring check, when a request by the application belonging to the category of the application having a higher priority is allowed, the AS layer transmits the RRC connection request message to the eNodeB.

II. Suggestion 2 of the present specification (suggestion 6 of the provisional application)

Suggestion 2 of the present specification suggests arranging, by the network (MME/SCSN/S-GW/P-GW, etc.), information on the category of the application for ACDC by priorities and delivering the arranged information to the UE 100.

In other words, in order to differentiate a general MO service (e.g., an originating call or originating data call, IMS originating voice call, IMS originating video call), namely, in order to differentiate a specific application service, according suggestion 1 of the present specification, information on the category of the application for the ACDC may be arranged according to the priorities and delivered to the UEE 100.

Such information on the category of the application for the ACDC may be orderly divided according to the priority according to the suggestion 1 of the present specification.

Namely, when information on the category of the application for ACDC is equal to 1 (or A or other binary and/or string, etc.), it means the highest priority, and such an application service may mean that the ACDC barring check should be passed with the highest priority. If information on the category of the application for the ACDC is equal to 2 (e.g., B or other binary and/or string, etc.), it means the second highest priority, and in the case of such an application service, it may mean that the ACDC barring check should be passed with the second highest priority. If information on the category of the application for the ACDC is equal to n (or z), it means the lowest priority, and in the case of such an application service, it may mean that the ACDC barring check is passed with the lowest priority or is barred.

On the contrary, information on the category of the application the ACDC may be divided in a reverse order according to the priorities. Namely, when information on the category of the application for the ACDC is equal to 1 (or A, other binary and/or string, etc.), it means the lowest priority, and in the case of such an application service, it may mean that ACDC barring check should be passed with the last priority or be barred. If information on the category of the application for the ACDC is equal to n (or Z), it means the highest priority, and in the case of such an application service, it may mean that the ACDC barring check should be passed with the highest priority.

Meanwhile, the ACDC barring information may be provided to the UE100 per application category for the ACDC.

III. Suggestion 3 of the present application: Suggestion 7 of the provisional application Suggestion 3 of the present specification suggests that information on the category of the application arranged according to the priorities be included in the NAS setting MO or new application MO (e.g., application specific (access control) management object) and provided to the UE 100 through OMA DM in order to implement suggestion 1.

Meanwhile, the ACDC barring information may be defined per application category, and such ACDC barring information may be included in the NAS setting MO or the application MO so as to be provided to the UE 100.

Such an MO may include the following information.

ACDC (application specific control for data communication) (or application specific access control) indication/information
   Application information/ID
   Information on the category of the application for ACDC
   ACDC barring information
   PLMN
   PLMN preference
   Authorization
   Validity timer
   Capability indication
   APN
   Protocol type
   IP address/port number
   QoS
   Domain name
   Others Each of the abovementioned information is described in detail as follows.

A) ACDC indication/information: Indication/information requesting the UE 100 to differentiate according per information on the category of the application/ID for ACDC B) Application/ID: Identification information for the application of the UE 100

B-a. Application ID is defined as OSId and OSAppId.

B-a-i. OSId may mean the operating system identifier, and OSAPPId may mean an operating system specific application identifier.

C) Information on the category of the application for ACDC: It means group/category/priority information/ID (e.g., I, I, III, IV, . . . /1, 2, 3, 4, . . . /A, B, C, D, . . . ) for the applications of the UE 100. Further, this means the application group/category priority information ID mapping information for the applications of the UE 100.

C-a. Group/category/priority information/ID for the applications of the UE 100 may be displayed as follows (e.g., bitmap format: 2 bits, 4 bits, 8 bits, 16 bits, etc.).

For example, the case of 8 bits may be as follows.

TABLE 3

| 1 | 0 0 0 0 0 0 0 0 | : Application category 1 (or 0) for ACDC |
|---|---|---|
| 2 | 0 0 0 0 0 0 0 1 | Application category 2 (or 1) for ACDC |
| 3 | 0 0 0 0 0 0 1 0 | Application category 3 (or 2) for ACDC |
| 4 | 0 0 0 0 0 0 1 1 | Application category 4 (or 3) for ACDC |
| 5 | 0 0 0 0 0 1 0 0 | Application category 5 (or 4) for ACDC |
| 6 | ~ | |
| 7 | 1 1 1 1 1 1 1 1 | Application category 256 (or 255) for ACDC |

C-b. Group/category/priority information/ID for the applications of the UE 100 may additionally include the following information.

C-b-i. Application category I for ACDC is equal to application ID "A" (=OSId+OSAppId "A")

For example Application category I for ACDC=application ID "KaTalk"=OSID "Android (os IOS)"+OSAppId "Katalk"

Alternatively, the application ID may be displayed as the letter/string or binary. At this time, OSId means the ID of the operating system and may be displayed as letter/string or binary. Here, the OSId may also include the version information of the operating system (OS).

C-b-ii. Application category II for ACDC=application ID "B" (=OSId+OSAppId

For example, application category II for ACDC=Application ID "GoogleMap"=OSId "Android (or IOS)"+OSAppId "GoogleMap"

Further, the application ID may be displayed as letter/string or binary. At this time, OSId means the ID of the operating system may be displayed as letter/string or binary. Here, the OSId may also include the version information of the operating system (OS).

C-c. When meaning application group/category/priority information ID mapping information for the applications of the UE 100, there may be an application category for ACDC including wild-carded application IDs meaning unspecific/undefined/uncategorized applications which are not a specific application ID.

C-c-i. Application category X for ACDC=application ID "xxx (wild card ID)"

Here, the "xxx" means unspecific/undefined/uncategorized applications.

C-c-ii. Further, it may be that the category of the application X for ACDC=" " (here, a blank means wild card ID).

C-c-iii. The above B includes defining specific ID but the C means using wild card ID meaning unspecific application ID.

D) ACDC barring information: Application group/category/priority information/information such as barring ratio, barring factor, average barring time. ACB skipping setting (ACB skipping is on/configured/true or ACB skipping is off/not configured/false), roaming, etc./parameters PLMN: PLMN information of a company PLMN preference: It indicates preference for whether the UE will apply application group/category preference information/ID and related information/parameter information provided in the HPLMN or will application group/category/priority information/ID and related information/parameter information provided in the VPLMN. If it has been set that the HPLMN is preferred, the UE applies the application group/category/priority information/ID and related information/parameter information provided in the HPLMN and disregards related information provided in the VPLMN.

G) Authorization: Authorization parameter for the application group/category/priority information/ID. This parameter may include two values of "pre-authorized" and "conditionally authorized". When a value having been set as pre-authorized is provided, it means that the UE 100 has been pre-authorized for the application group/category/priority information/ID from the HPLMN, and in this case, a separate authorization procedure from the HSS and/or AS (application server) and/or AAA (authentication, authorization, accounting) of the network (HPLMN) is not necessary. When a value having been set as conditionally authorized is provided, it means that the UE 100 needs a separate authorization procedure for the application group/category/priority information/ID.

H) Valid period: Valid period of configuration information/parameter provided in the MO. The UE performs the application service connection differentiation operation suggested in the present invention during only this valid period.

I) Capability indication/information: Information such as whether to support the differentiation function of the network J) APN: APN information on application group/category/priorities (e.g., application group/category I=APN 1, application group/category II=APN 2, etc.)

K) Protocol type: Internet protocol type associated with applications of the UE

L) IP address/port number: IP address/port number associated with applications of the UE M) QoS: QoS information associated with the applications of the UE N) Domain name: Domain name associated with the associations of the UE (fully qualified domain name (e.g., www.example.com))

O) Others: Additional information of network

Figure 12A:
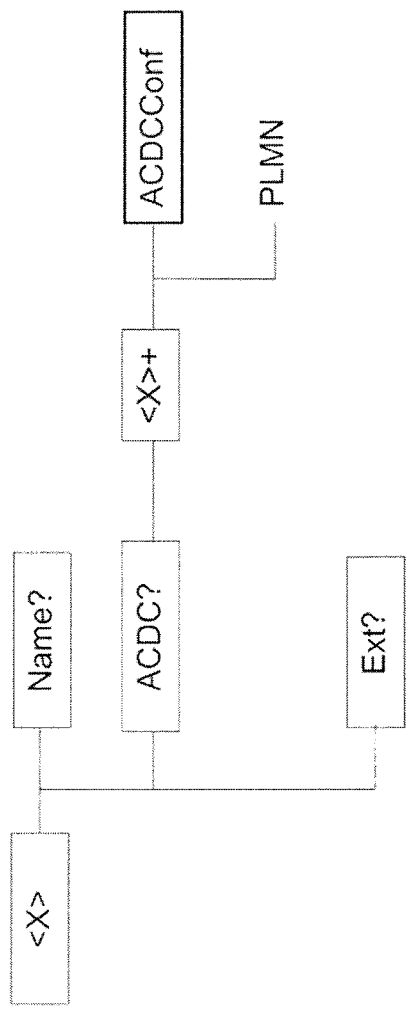
FIGS. 12a and 12b illustrate an MO (management object) including ACDC barring information in the form of a tree.
Figure 12B:
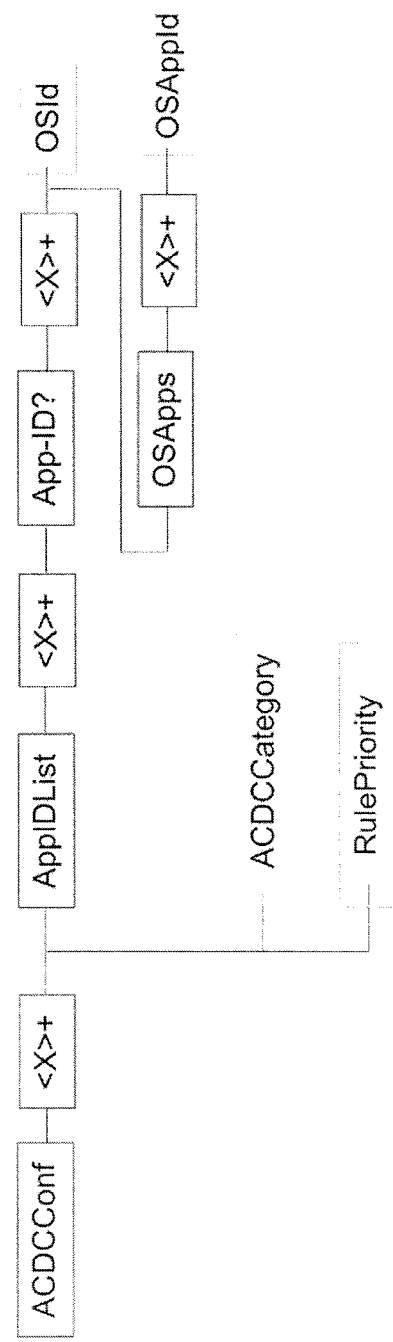
Figure 13:
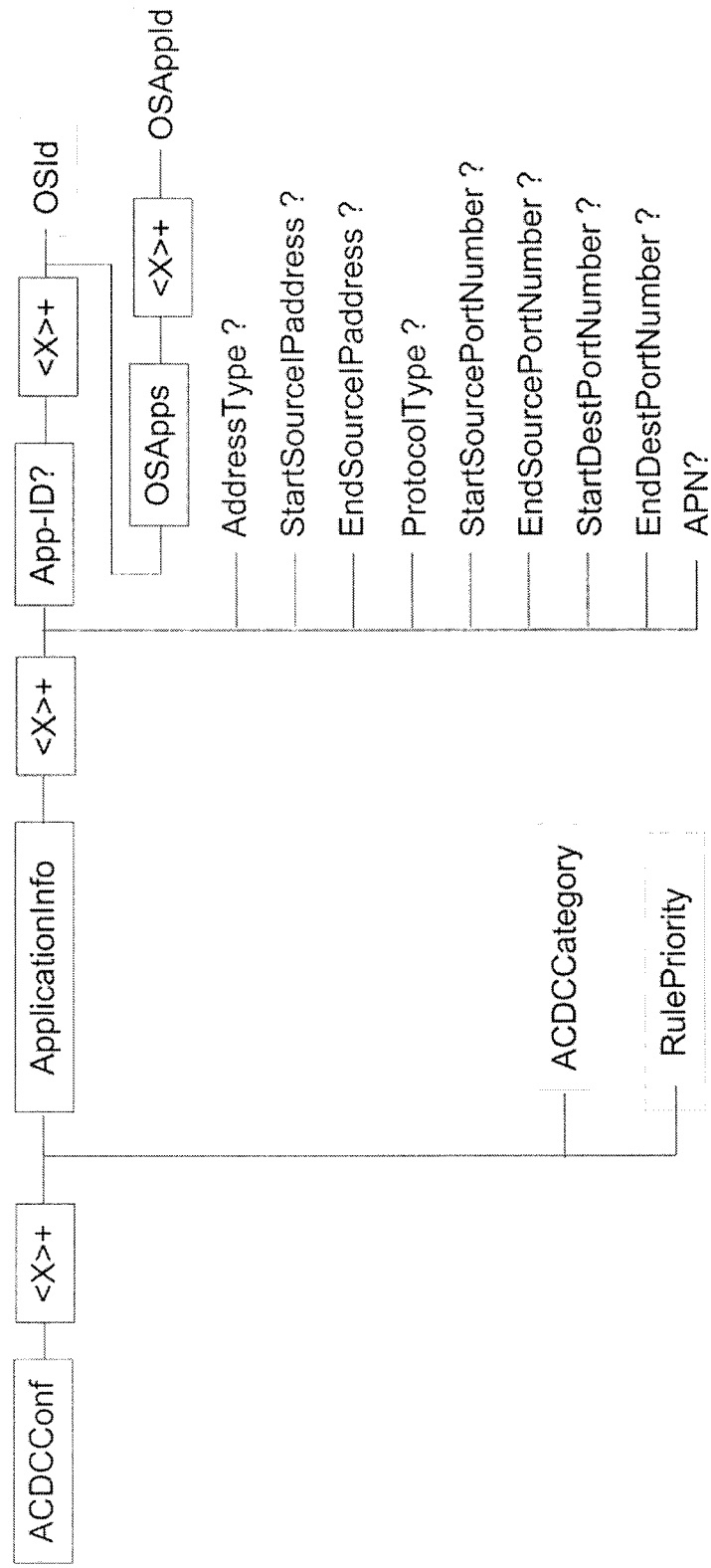
FIG. 13 illustrates an MO (management object) including ACDC barring information in another form of a tree.

The MO may be expressed as a trees structure as illustrated in FIGS. 12a and 12b. Further, the MO may be expressed as the tree structure as illustrated in FIG. 13.

Meanwhile, Entire or partial information of the A) to O) may be included in the MO.

Figure 14:
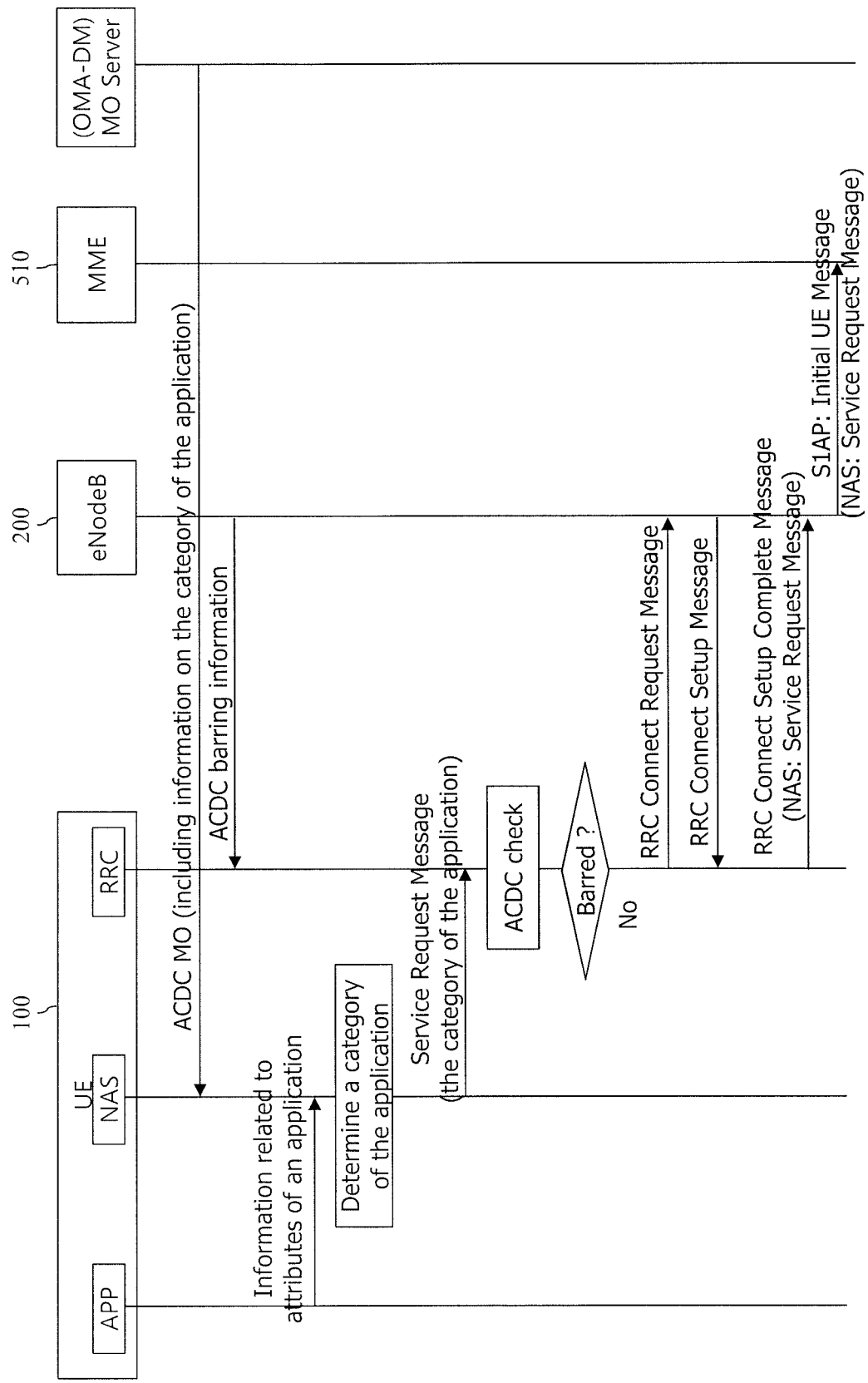
FIG. 14 is a signal flowchart illustrating an example of determining a category of a currently executed application based on information on the category of the application included in the MO (management object).

Such MO may be delivered to the UE as illustrated in FIG. 14.

The above suggestions may be combined and used.

The above-described points may be implemented in hardware, which will be described with reference to a drawing.

Figure 15:
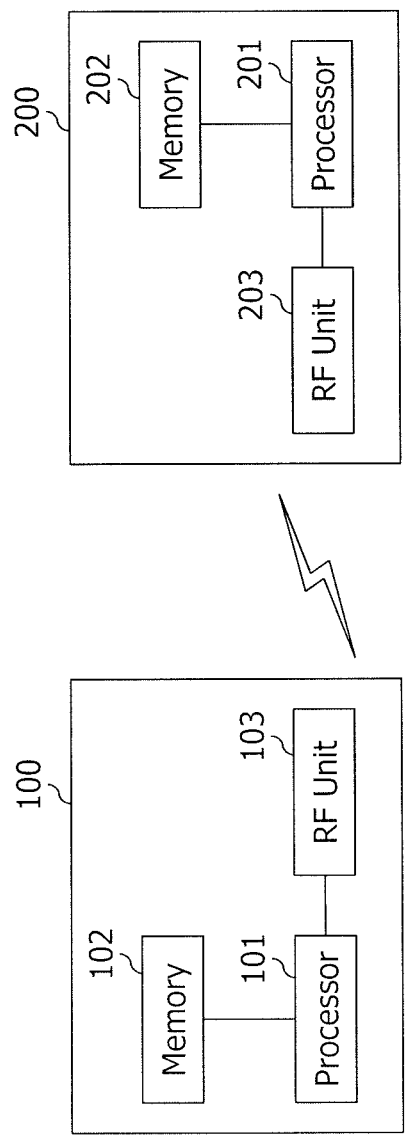
FIG. 15 is a block diagram of an UE 100 and an eNodeB 200 according to an embodiment of the present invention.

FIG. 15 is a block diagram of an UE 100 and an eNodeB 200 according to an embodiment of the present invention.

As illustrated in FIG. 15, the UE100 includes a storage means 101, a controller 102, and a transmission/reception unit 103. Further, the eNodeB 200 includes a storage means 201, a controller 202, and a transmission/reception unit 203.

The storage means 101 and 201 store the above-described methods.

The controllers 102 and 202 control the storage means 101 and 201 and the transmission/reception units 103 and 203. Specifically, the controllers 102 respectively execute the methods stored in the storage means 101 and 201. Further, the controllers 102 and 202 transmit the above-described signals through the transmission/reception units 103 and 203.

In the above, desirable embodiments of the present invention have been described as examples, but the scope of the present invention is not limited to such specific embodiments, and thus the present invention may be modified, changed, or improved in various forms within the scope of the present invention and the disclosure of the claims.

What is claimed is:

1. A method for barring a network access, the method performed by a User Equipment (UE) and comprising:
performing a first application specific congestion control for data communication (ACDC) barring check based on a first ACDC category for a first network access request and ACDC barring information,
wherein the first network access request is barred by the first ACDC barring check;
determining a second ACDC category for a second network access request based on ACDC management object (MO) information;
performing a second ACDC barring check based on the second ACDC category for the second network access request and ACDC barring information; and
based on (i) that the first network access request has been barred by the first ACDC check and (ii) that the second ACDC category has a higher priority than the first ACDC category, performing the second network access request.

2. The method of claim 1, further comprising:
running a barring timer when the first network access request is barred.

3. The method of claim 2, wherein the barring timer is the same as a barring timer used for an access class barring (ACB) or a dedicated barring timer different from the barring timer used for the ACB.

4. The method of claim 2, further comprising:
stopping the barring timer based on that the second network access request is allowed based on the second ACDC barring check.

5. The method of claim 1, further wherein the ADCD MO information includes application related attribute information and ACDC category information related to the application related attribute information.

6. The method of claim 5, wherein the second ACDC category is determined based on the application related attribute information and the ACDC category information.

7. The method of claim 5, wherein the ACDC category information includes ACDC categories mapped to identifiers (IDs) of applications.

8. The method of claim 1, further comprising:
receiving the ACDC barring information.

9. The method of claim 8, wherein the ACDC barring information includes at least one of a barring rate, a barring factor, a barring time, a roaming information, or an access class barring (ACB) skipping configuration, and
wherein the barring rate, the barring factor, the barring time, the roaming information, or the ACB skipping configuration are defined per a specific unit of an application.

10. The method of claim 1, wherein the second ACDC category is determined among ACDC category values based on the ACDC MO information,
wherein each of the ACDC category values represents a rank of the ACDC category in descending order, and
wherein a number of the ACDC category values are bigger than or equal to 16.

11. A user equipment (UE) for barring a network access, the UE comprising:
a transceiver; and
a processor which controls the transceiver, wherein the processor is configured to:
perform a first application specific congestion control for data communication (ACDC) barring check based on a first ACDC category for a first network access request and ACDC barring information,
wherein the first network access request is barred by the first ACDC barring check;
determine a second ACDC category for a second network access request based on ACDC management object (MO) information;
perform a second ACDC barring check based on the second ACDC category for the second network access request for the second network access request and ACDC barring information; and
based on (i) that the first network access request has been barred by the first ACDC barring check and (ii) that the second ACDC category has a higher priority than the first ACDC category, perform the second network access request.

12. The UE of claim 11, wherein the processor is further configured to:
run a barring timer when the first network access request is barred, and
wherein the barring timer is the same as a barring timer used for an access class barring (ACB) or a dedicated barring timer different from the barring timer used for the ACB.

13. The UE of claim 11, wherein the processor is further configured to:
wherein the ACDC MO information includes application related attribute information and ACDC category information related to the application related attribute information.

14. The UE of claim 13, wherein the second ACDC category is determined based on the application related attribute information and the ACDC category information.

15. The UE of claim 13, wherein the ACDC category information includes categories mapped to identifiers (IDs) of applications.

16. The UE of claim 12, wherein the processor is further configured to:
stop the barring timer based on that the second network access request is allowed according to the ACDC barring check.

17. The UE of claim 11, wherein the second ACDC category is determined among ACDC category values based on the ACDC MO information,
wherein each of the ACDC category values represents a rank of the ACDC category in descending order, and
wherein a number of the ACDC category values are bigger than or equal to 16.

* * * * *